(12) United States Patent
Yomo et al.

(10) Patent No.: US 9,191,253 B2
(45) Date of Patent: Nov. 17, 2015

(54) ADAPTIVE EQUALIZER

(75) Inventors: Hidekuni Yomo, Kanagawa (JP);
Akihiko Matsuoka, Kanagawa (JP);
Atsushi Maruyama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/239,923

(22) PCT Filed: Jun. 29, 2012

(86) PCT No.: PCT/JP2012/004250
§ 371 (c)(1),
(2), (4) Date: Feb. 20, 2014

(87) PCT Pub. No.: WO2013/057855
PCT Pub. Date: Apr. 25, 2013

(65) Prior Publication Data
US 2014/0192856 A1  Jul. 10, 2014

(30) Foreign Application Priority Data
Oct. 17, 2011  (JP) .................................. 2011-227922

(51) Int. Cl.
*H03H 7/30* (2006.01)
*H04L 27/01* (2006.01)
(Continued)

(52) U.S. Cl.
CPC .............. *H04L 27/01* (2013.01); *G06F 17/142* (2013.01); *H04L 25/03159* (2013.01); *H04L 2025/03414* (2013.01)

(58) Field of Classification Search
CPC ........................................................ H04L 1/04
USPC ........................................................ 375/232
See application file for complete search history.

(56) References Cited

U.S. PATENT DOCUMENTS

| 5,883,852 A | 3/1999 | Ghia et al. |
| 7,251,186 B1 | 7/2007 | Kengeri et al. |
| 2002/0037058 A1 | 3/2002 | Birru |

(Continued)

FOREIGN PATENT DOCUMENTS

| CN | 1463526 A | 12/2003 |
| CN | 101317172 A | 12/2008 |

(Continued)

OTHER PUBLICATIONS

John J. Shynk, Frequency-Domain and Multirate Adaptive Filtering, IEEE Signal Processing Magazine, Jan. 1992, vol. 9 No. 1, pp. 14-37, Fig 6.

(Continued)

*Primary Examiner* — Lihong Yu
(74) *Attorney, Agent, or Firm* — Pearne & Gordon LLP

(57) ABSTRACT

An adaptive equalizer (100) has a signal converter (200) for performing a fast Fourier transform and/or an inverse fast Fourier transform. The signal converter (200) has: a first wide-bit memory (201) capable of reading/writing a plurality of sample signals; a first register group (202) comprising a plurality of registers capable of accessing the first wide-bit memory (201); a butterfly computation unit group (204) comprising a plurality of butterfly computation units; and a first connection switching unit (203) for switching the state of connection between the plurality of registers and the plurality of butterfly computation units.

11 Claims, 16 Drawing Sheets

(51) Int. Cl.
*G06F 17/14* (2006.01)
*H04L 25/03* (2006.01)

(56) References Cited

U.S. PATENT DOCUMENTS

| | | |
|---|---|---|
| 2003/0007554 A1 | 1/2003 | Birru |
| 2004/0059766 A1* | 3/2004 | Yeh ............................... 708/406 |
| 2004/0105506 A1 | 6/2004 | Baek et al. |
| 2005/0094804 A1* | 5/2005 | Nishijima et al. .............. 380/28 |
| 2006/0253514 A1* | 11/2006 | Yu ................................ 708/404 |
| 2009/0150470 A1 | 6/2009 | Miyano et al. |
| 2009/0313314 A1* | 12/2009 | Mundarath et al. ........... 708/405 |
| 2014/0192856 A1 | 7/2014 | Yomo et al. |

FOREIGN PATENT DOCUMENTS

| | | |
|---|---|---|
| JP | 08-063969 A | 3/1996 |
| JP | 2002-314498 A | 10/2002 |
| JP | 2004-503180 A | 1/2004 |
| JP | 2004-530365 A | 9/2004 |
| WO | 2007/060879 A1 | 5/2007 |

OTHER PUBLICATIONS

Submission of Applicant's Informal Comments for Application No. PCT/JP2012/004250 dated Dec. 26, 2012.
International Search Report for Application No. PCT/JP2012/004250 dated Sep. 4, 2012.
US Office action for U.S. Appl. No. 14/239,973 dated Jan. 8, 2015.
Extended European Search Report for EP 12841483.6 dated May 27, 2015.
US Office Action for U.S. Appl. No. 14/239,973 dated Apr. 24, 2015.

\* cited by examiner

ADAPTIVE EQUALIZER

TECHNICAL FIELD

The present invention relates to an adaptive equalizer which performs adaptive equalization for a time-domain signal in a frequency domain.

BACKGROUND ART

In a wireless propagation channel, a multi-path wave is generated other than a main wave due to a reflective object and other objects. Accordingly, it is necessary for a receiving apparatus of a radio signal to eliminate the effect of the multi-path wave. The ATSC (Advanced Television Systems Committee) standard which is a standard for digital television broadcast in North America, South Korea, and other countries adopts single-carrier modulation. It is for this reason that receiving apparatuses in the ATSC standard is designed to use adaptive equalizers, unlike other broadcast standards such as OFDM (Orthogonal Frequency Division Multiplexing) adopting multi-carrier modulation.

Generally, in single-carrier modulation, adaptive equalization is performed in a time domain. However, in the adaptive equalization in the time domain, convolution operation is necessary for filtering and updating coefficients, and the circuit size increases as the tap count increases.

In response to the problem, there is a technique for performing the adaptive equalization on a time-domain signal in a frequency domain, instead of the time domain (for example, see PTL1, PTL2, and NPL1). According to the techniques disclosed in PTL1, PTL2, and NPL1 (hereafter referred to as "related art"), adaptive equalization is performed after converting a time-domain signal into a frequency-domain signal by the Fast Fourier Transform. Furthermore, according to the conventional technology, a signal in a frequency domain alter the adaptive equalization is converted into a time-domain signal by the Inverse Fast Fourier Transform. In a reception apparatus using a single-carrier modulation signal according to the related art is capable of improving reception capacity while suppressing the increase in the circuit size.

CITATION LIST

Patent Literature

PTL1
Japanese Unexamined Patent Application Publication (Translation of PCT Application) No. 2004-503180
PTL2
Japanese Unexamined Patent Application Publication (Translation of PCT Application) No. 2004-530365

Non-Patent Literature

NPL1
John J. Shynk, "Frequency-Domain and Multirate Adaptive Filtering", IEEE SP MAGAZINE, January 1992, pp. 14-37

SUMMARY OF INVENTION

Technical Problem

However, with the conventional technology, when a large number of taps are required, or when high-speed reception is necessary, there is a problem that an operational clock frequency necessary for an adaptive equalizer increases. With the conventional technology, when the operational clock frequency increases, there are problems that the power consumption of the adaptive equalizer increases, or the increased operational clock frequency causes a trouble when implementing the adaptive equalizer in the FPGA (Field Programmable Gate Array). Accordingly, in an adaptive equalizer which performs the adaptive equalization on a time-domain signal in the frequency domain, it is necessary to suppress the increase in the circuit size and the operational clock frequency as ranch as possible.

It is an object of the present invention to provide an adaptive equalizer that performs adaptive equalization on a time-domain signal in the frequency domain, capable of suppressing the increase in the circuit size and the operational clock frequency.

Solution to Problem

The adaptive equalizer according to the present invention is an adaptive equalizer that performs adaptive equalization on a time-domain signal in a frequency domain, comprising a signal conversion section that performs at least one of a fast Fourier transform and an inverse fast Fourier transform, wherein the signal conversion section including: a memory capable of reading and writing signals for 2M samples, where M is a natural number; 2M registers accessible to the memory; M butterfly operation sections; and a switching control section that switches a connection state between the 2M registers and the M butterfly operation sections.

Advantageous Effects of Invention

According to the present invention, in an adaptive equalizer that performs adaptive equalization on a time-domain signal in the frequency domain, the increase in the circuit size and the operational clock frequency can be suppressed.

DESCRIPTION OF EMBODIMENTS

Embodiments of the present invention will be described in detail with reference to the drawings as follows.

Embodiment 1

Figure 1:
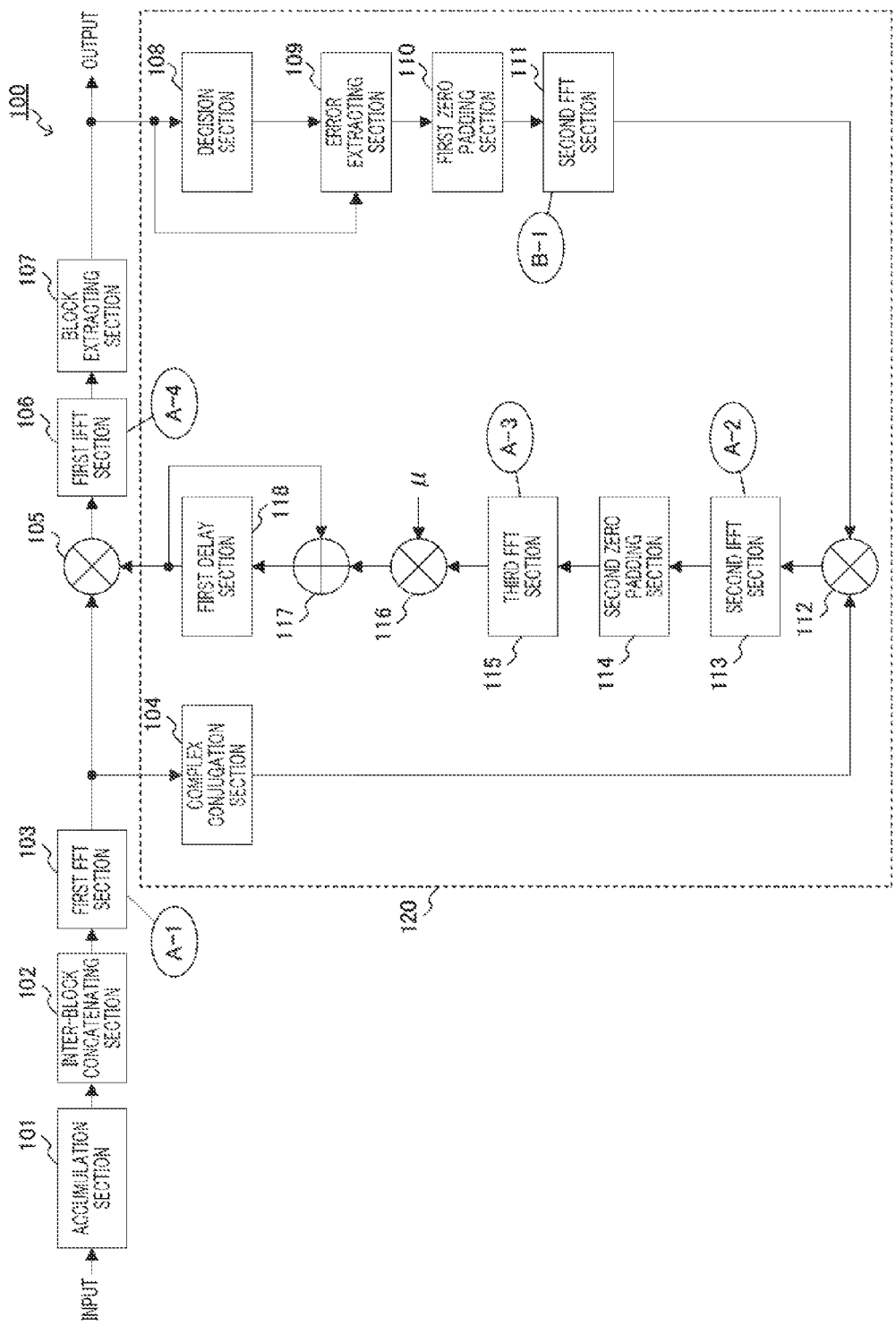
FIG. 1 is a block diagram illustrating a configuration of an adaptive equalizer according to Embodiment 1 of the present invention.

FIG. 1 is a block diagram illustrating a configuration of an adaptive equalizer according to Embodiment 1 of the present invention.

In FIG. 1, adaptive equalizer 100 includes accumulation section 101, inter-block concatenating section 102, first Fast Fourier Transform section (hereafter referred to as "FFT section") 103, complex conjugation section 104, and first multiplier 105. Adaptive equalizer 100 also includes first inverse Fast Fourier Transform section (hereafter referred to as "IFFT section") 106, block extracting section 107, decision section 108, error extracting section 109, first zero padding section 110, and second FFT section 111. Adaptive equalizer 100 also includes second multiplier 112, second IFFT section 113, second zero padding section 114, third FFT section 115, third multiplier 116, first adder 117, and first delay section 118.

Accumulation section 101 receives input of time-domain signals, and sequentially accumulates the time-domain signals for a predetermined block size.

Inter-block concatenating section 102 concatenates the block accumulated in accumulation section 101 and a newest block, and outputs the concatenated block.

First FFT section 103 performs FFT (Fast Fourier Transform) on the output from inter-block connecting section 102, and outputs the signal obtained.

Complex conjugation section 104 outputs complex conjugation of first FFT section 103.

First multiplier 105 multiplies the output from first FFT section 103 and output from first delay section 118 to be described later (adaptive equalizer coefficient converted into a frequency domain), and outputs the signal obtained.

First IFFT section 106 performs the Inverse Fast Fourier Transform (IFFT) on the output from first multiplier 105, and outputs the signal obtained.

Block extracting section 107 extracts the newest signal-series block from the output of first IFFT section 106, and outputs the extracted block.

Decision section 108 outputs a decision result to the output from block extracting section 107.

Error extracting section 109 extracts an error from an ideal signal point, from the output of block extracting section 107 (that is, the output from first IFFT 106), based on the output from decision section 108, and outputs the extracted error.

First zero padding section 110 receives an input of an error received by error extracting section 109, sets a part in a series of errors other than the predetermined tap coefficient to zero, and outputs the obtained signal.

Second FFT section 111 performs FFT on the output from first zero padding section 110, and outputs the obtained signal.

Second multiplier 112 multiplies the output from complex conjugation section 104 (that is, the complex conjugation of output from first FFT section 103) and the output from second FFT section 111, and outputs the signal obtained.

Second IFFT section 113 performs IFFT on the result of the multiplication by second multiplier 112, and outputs the signal obtained.

Second zero padding section 114 pads zero to a part other than a predetermined tap coefficient, out of the output from second IFFT section 113, and outputs the signal obtained.

Third FFT section 115 performs FFT on the output from second zero padding section 114, and outputs the signal obtained.

Note that, in adaptive equalizer 100, second IFFT section 113, second zero padding section 114, third FFT section 115 are placed after second multiplier 112. With this, adaptive equalizer 100 according to Embodiment can remove the influence of FFT on a discontinuous signal. Stated differently, these sections are capable of purposefully converting the multiplication result of the error series and the input signal in the frequency domain into the time domain, and padding zero to a part invalid as a tap coefficient, and converting the result into a signal in the frequency domain again. With this, the operation result completely identical to a block update in the time domain can be obtained, allowing the high reception capacity to be maintained.

Third multiplier 116 multiplies the output from third FFT section 115 and a predetermined coefficient μ, and outputs the signal obtained.

First adder 117 adds the output from third multiplier 116 and the output from first delay section 118 in a later stage, and outputs the signal obtained.

First delay section 118 delays the output from first adder 117, and outputs the delayed signal to first multiplier 105 as an adaptive equalizer coefficient converted into the frequency domain.

Stated differently, first adder 117 and first delay section 118 function as an accumulation section that accumulates the output from third multiplier 116.

The part from complex conjugation section 104 and decision section 108 to first delay section 118 functions as first coefficient updating section 120 in adaptive equalizer 100.

By configuring adaptive equalize 100 as illustrated in FIG. 1, adaptive equalizer 100 can perform adaptive equalization on a time-domain signal in the frequency domain, instead of the time domain.

When the reception signal is a signal for television broadcast, it is necessary to process the reception signal in real time. Stated differently, all of the operation performed by adaptive equalizer 100 must be completed within the time of a block size.

In adaptive equalizer 100, FFT/IFFT are performed by five sections, namely, first to third FFT sections 103, 111, and 115, and first and second IFFT sections 106 and 113. FFT/IFFT reduces the number of operations required by performing a part of the operation in parallel, and reduces the time necessary for the operation by adaptive equalizer 100. Accordingly, adaptive equalizer 100 may perform FFT/IFFT operations that can be performed in parallel execution in parallel.

In the following description, the system from inter block concatenating section 102 to first multiplier 105 through complex conjugation section 104 is referred to as the system A. The system from first multiplier 105 to second multiplier 112 in the system A through decision section 108 is referred to as the system B. Furthermore, as illustrated in FIG. 1, the operation by first FFT section 103 is referred to as process A-1, the operation by second FFT section 113 is referred to as process A-2, the operation by third FFT section 115 is referred to as process A-3, and the operation by first IFFT section 106 is referred to as A-4. Subsequently, the operation by second FFT section 111 is referred to as process B-1. First to third FFT sections 103, 111, and 115, and first and second IFFT sections 106 and 113 are collectively referred to as "signal conversion section" when necessary.

Figure 2:
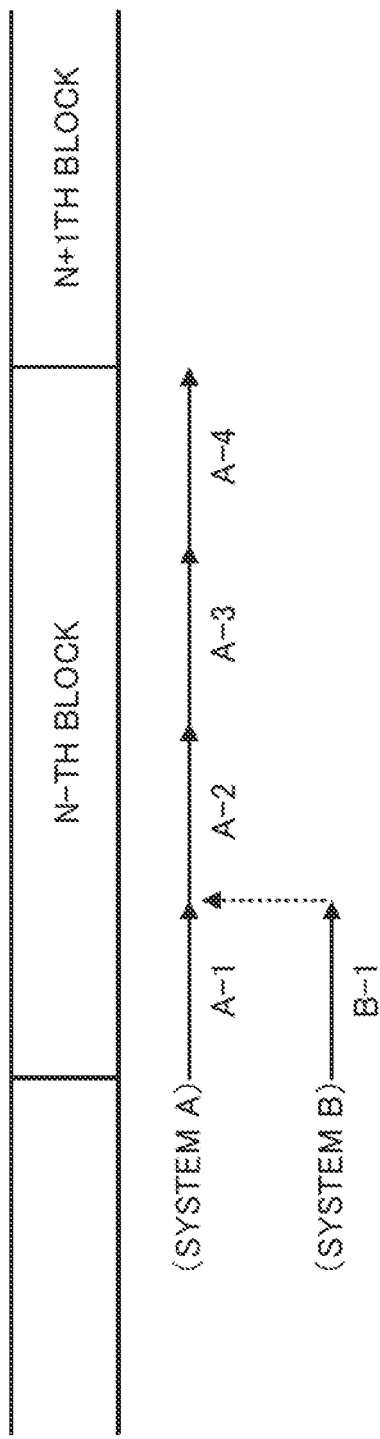
FIG. 2 is a chart illustrating an example of timing of processing by each signal conversion section according to Embodiment 1 of the present invention.

FIG. 2 is a chart illustrating an example of the process timing by each signal conversion section in adaptive equalizer 100.

Process A-1 and process B-1 are not dependent on each other. Adaptive equalizer 100 includes two systems for performing FFT/IFFT operations, and performs process A-1 and process B-1 in parallel, as illustrated in FIG. 2, for example. With this process, adaptive equalizer 100 can reduce the time necessary for performing FFT/IFFT for one operation.

However, process A-2 is dependent on the process data of process B-1, and thus process B-1 must be complete before process A-2 starts. Accordingly, with regard to the system A, it is necessary for adaptive equalizer 100 to complete processes A-1 to A-4 within the block, as illustrated in FIG. 2.

Stated differently, even if adaptive equalizer 100 increases the system to more than three systems due to limitation in the dependency of the signal processing data, the operation time necessary for FFT/IFFT per block size cannot be reduced to a time necessary for four operations.

If the number of received symbols collectively processed in the frequency domain (block size) is 416 symbols which are half the number of symbols in one segment defined by the ATSC standard, the operation time for the block size is approximately 38.65 µsec. Accordingly, in the ATSC, standard, FFT/IFFT at 1024 points must be performed for five times (four times in the example above) in approximately 38.65 µsec. Even if the processing time other than FFT/IFFT is ignored, operation for one FFT/IFFT must be complete within 7.73 µsec (in the example above, 9.66 µsec).

If it is not necessary to update the coefficient based on the latest output from the equalizer, there will be no problem, if the adaptive equalizer performs the process in pipeline and increases the processing delay. In an actual adaptive equalizer, however, the characteristics are significantly degraded without an update on the coefficient based on the latest output from the equalizer. Consequently, the coefficients do not converge due to active change in a wireless channel, making the reception impossible.

Conventionally, the processing cycle count in FFT/IFFT and the circuit size are inversely proportionate.

The following is more specific description. For a broadcaster, it is usually preferable to maintain a broadcast area as wide as possible, and to transmit the signal at high output power so as to reduce the cost for infrastructure. Accordingly, the delay wave due to a distant reflective object arrives with a delay of a few hundred symbols or more. Accordingly, the tap count to be processed by an adaptive equalizer is few hundred taps or more.

Stated differently, in an expected adapted system, it is necessary to deal with a long-delay multi-propagation path longer than or equal to 40 µsec. Accordingly, it is considered that at least 500 taps are necessary. In FFT/IFFT, it is necessary to calculate a result equal to convolution operation of block size 416 and tap count 500. Accordingly, since 512< (416+500)<1024, at least 1024 points are necessary. Stated differently, it is necessary to complete FFT/IFFT operation at 1024 points in a ratio once per 416/5=83.2 symbols.

Note that, in the OFDM system, if 8192 points and a guard interval of ⅛ are expected, it is sufficient that 8192-point FFT may be performed once within 9216 samples, and thus the processing cycle count is not strictly limited.

In the case of 1024-point FFT, the complex numbers are multiplied for 5120 times. Accordingly, if FFT is implemented by a single port memory and a single butterfly operation circuit, signal transform section has to operate at an oversampling frequency of 5120/83.2=61.5 times.

Furthermore, in an adaptive equalizer, a plurality of butterfly operation circuits is arranged in parallel, and is combined with a multi-port memory. With this configuration, the cycle count may be reduced. However, as the number of port increases, the circuit size increases. In addition, a memory corresponding to the port count greater than 10 is not generally used, thereby leading to limitation in use. Although it is possible to replace the memory with a register, the change increases the circuit size.

Accordingly, in adaptive equalizer 100 according to Embodiment 1, the circuit is configured with a register that does not have limit on simultaneous access, achieving the active use of a single port memory. In general, a memory as a method for holding digital data of the same capacity may be implemented by an area for a fraction of that of a register. Stated differently, adaptive equalizer 100 in Embodiment 1 can suppress the increase in the circuit size by using the memory readable/writable a plurality of signal samples and a plurality of registers accessible to the memory.

Figure 3:
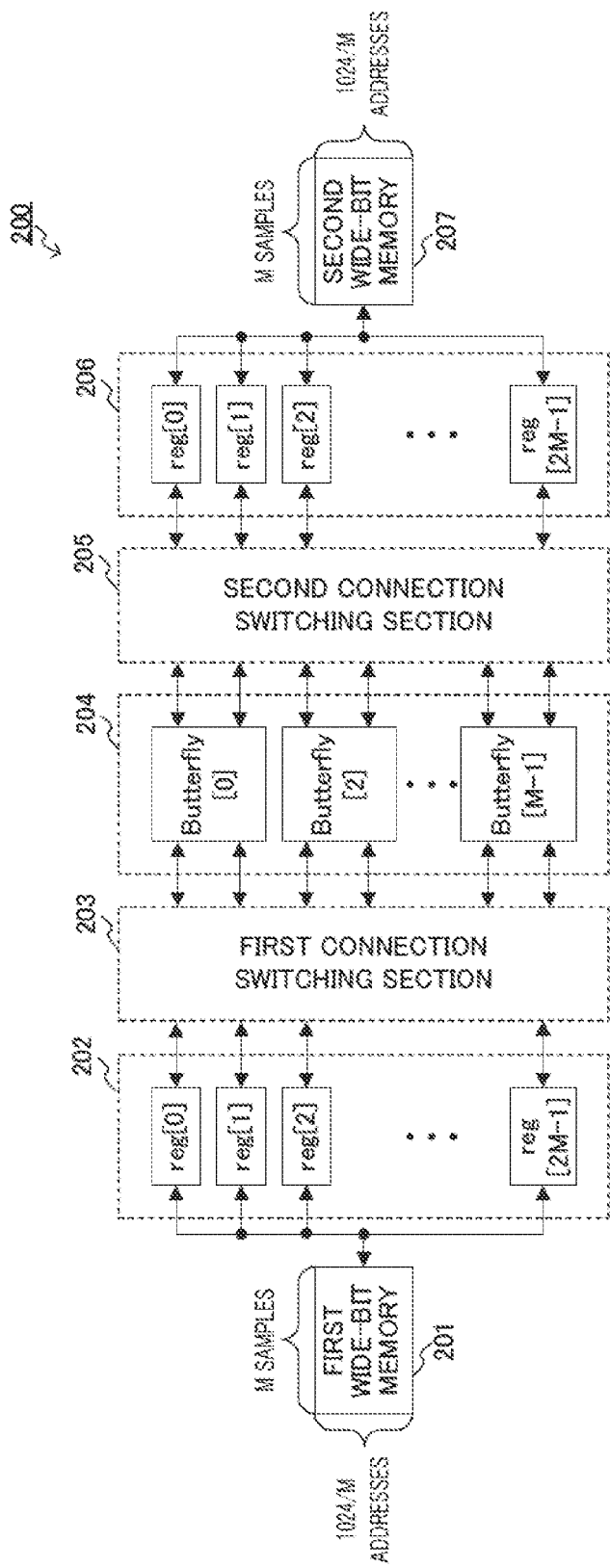
FIG. 3 is a block diagram illustrating the first example of the configuration of the signal conversion section according to Embodiment 1 of the present invention.

FIG. 3 is a block diagram illustrating the first example of the configuration of the signal conversion section according to Embodiment 1. Note that, as described above, signal conversion section refers to first to third FFT sections 103, 111, and 115, and first and second IFFT sections 106 and 113, as illustrated in FIG. 1. Each operation stage performed by FFT/IFFT is simply referred to as "stage" hereafter.

Signal conversion section 200 includes first wide-bit memory 201, first register group 202, first connection switching section 203, butterfly operation section group 204, second connection switching section 205, second register group 206, and second wide-bit memory 207.

First wide-bit memory 201 and second wide-bit memory 207 are memories with a large word size, capable of reading/writing signals (data) for M samples (2M samples twice). The order of data held by first wide-bit memory 201 and second wide-bit memory 207 is identical to the order of the data read by regular FFT/IFFT operations. However, first wide-bit memory 201 and second wide-bit memory 207 store data for M samples collectively in one address.

First register group 202 is composed of 2M registers accessible to first wide-bit memories 201. First register group 202 accesses first wide-bit memory 201 twice. With this process, first register group 202 simultaneously accesses 2M samples in parallel.

First connection switching section 203 switches the connection state between first register group 202 and butterfly operation section group 204 (hereafter referred to as a "connection state on first register group 202 side").

Butterfly operation section group 204 is composed of M butterfly operation sections, each of which performs butterfly operations.

Second connection switching section 205 switches the connection state between butterfly operation section group 204 and second register group 206 (hereafter referred to as "connection state on the side of second register group 206").

Second register group 206 is composed of 2M registers accessible to second wide-bit memories 207. Second register group 206 accesses second wide-bit memory 207 twice. With this process, second register group 206 simultaneously accesses 2M samples in parallel.

Note that, an operational clock frequency necessary for memory access by first register group 202 and second register group 206 is twice the operational clock frequency of butterfly operation section group 204. It is necessary for first register group 202 and second register group 206 to access the memory for 2×(1024/M) times for completing one stage. Subsequently, it is necessary for first connection switching section 203 and second connection switching section 205 to appropriately control switching of connection state between each register and each butterfly operation section for each, two memory accesses.

First connection switching section 203 and second connection switching section 205 switch roles of first wide-bit memory 201 and second wide-bit memory 207 between an output memory and an input memory. Stated differently, first connection switching section 203 and second connection switching section 205 switch, the connection state on the side of first register group 202 and the connection state on the side of second register group 206 to an appropriate state. The appropriate state refers to a state in which signal input is provided to each butterfly operation section from an appropriate register, and signal output from each butterfly operation section is output from an appropriate register.

Subsequently, butterfly operation section group 204 sequentially performs operation on each stage according to the switching in the connection state.

To put it differently, in FIG. 3, the traveling direction of the signals changes vertically in every stage. Stated differently, when the operation for 10 stages is necessary, signals move toward right in the first stage in FIG. 3, and the signals move toward left in the second stage in FIG. 3. As described above, signal processing section 200 (FFT section/IFFT section) can prevent the increase in the circuit size by switching the traveling direction of the signals for each stage and uses the circuit repetitively.

Furthermore, signal transforming section (FFT section/IFFT section) 200 can avoid the use of multiport that increases the circuit size, and implements the reception process in real time at a low operational clock frequency.

Note that, signal conversion section 200 may use a 2-bank wide-bit memory.

Figure 4:
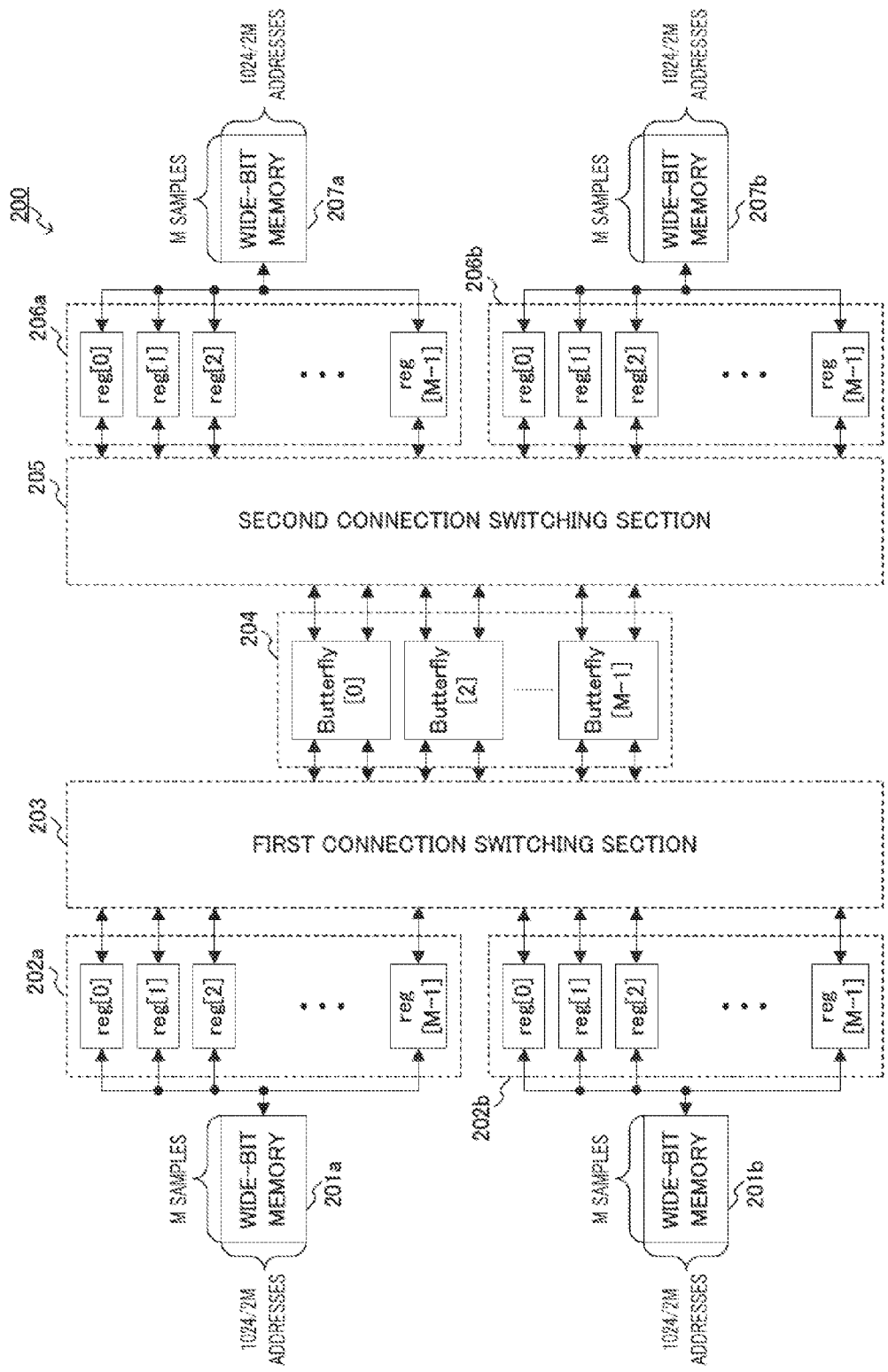
FIG. 4 is a block diagram illustrating the second example of the configuration of the signal conversion section according Embodiment 1 of the present invention.

FIG. 4 is a block diagram illustrating the second example of the configuration of signal conversion section 200.

As illustrated in FIG. 4, signal conversion section 200 includes wide-bit memories 201a, 201b and register groups 202a and 202b, instead of first wide-bit memory 201 and first register group 202 in FIG. 3. Signal conversion section 200 includes wide-bit memories 207a and 207b, and group of registers 206a and 206b, instead of second wide-bit memory 207 and second register group 206 in FIG. 3.

Wide-bit memories 201a, 201b, 207a, and 207b each store data for M samples in one address, and an address space is 1024/2M.

Register groups 202a, 202b, 206a, and 206b access wide-bit memories 201a, 201b, 207a, and 207b, respectively.

As described above, signal conversion section 200 is capable of reducing the number of memory access by configuring a two-bank wide-bit memory. Stated differently, the number of necessary memory access which was 2×(1024/M) in a one-bank configuration (see FIG. 3) is reduced to half. Accordingly, the operational clock frequency of the register group is determined to be identical to that of butterfly operation section, and can be set to half of the configuration illustrated in FIG. 3. Stated differently, in the operation for accessing the memory, while the clock frequency twice the clock frequency of the butterfly operation section is necessary in a one-bank configuration, the 1× clock frequency is sufficient for a two-bank configuration.

Note that, by adopting a dual port accessible to given two addresses at the same time to one-bank configuration, signal conversion section 200 only requires the 1× clock frequency while performing the process performed by the two-bank configuration. However, with the dual port configuration, the circuit size increases as the number of ports increases. In contrast, with the two-bank configuration, an address across banks cannot be accessed, and the increase in the circuit size to the one-bank configuration is negligible.

Stated differently, with the two-bank configuration illustrated in FIG. 4, signal conversion section 200 can achieve the real-time reception while avoiding the use of multiport which increases the circuit size at an even lower operational clock frequency.

Note that, it is necessary for each butterfly operation section to obtain an appropriate value for each stage, for a twiddle factor necessary for the butterfly operation. In FIG. 3 and FIG. 4, it is assumed that each butterfly operation section stores a twiddle factor. However, a twiddle factor memory storing twiddle factors for the stages may be provided outside of the butterfly operation section.

Figure 5:
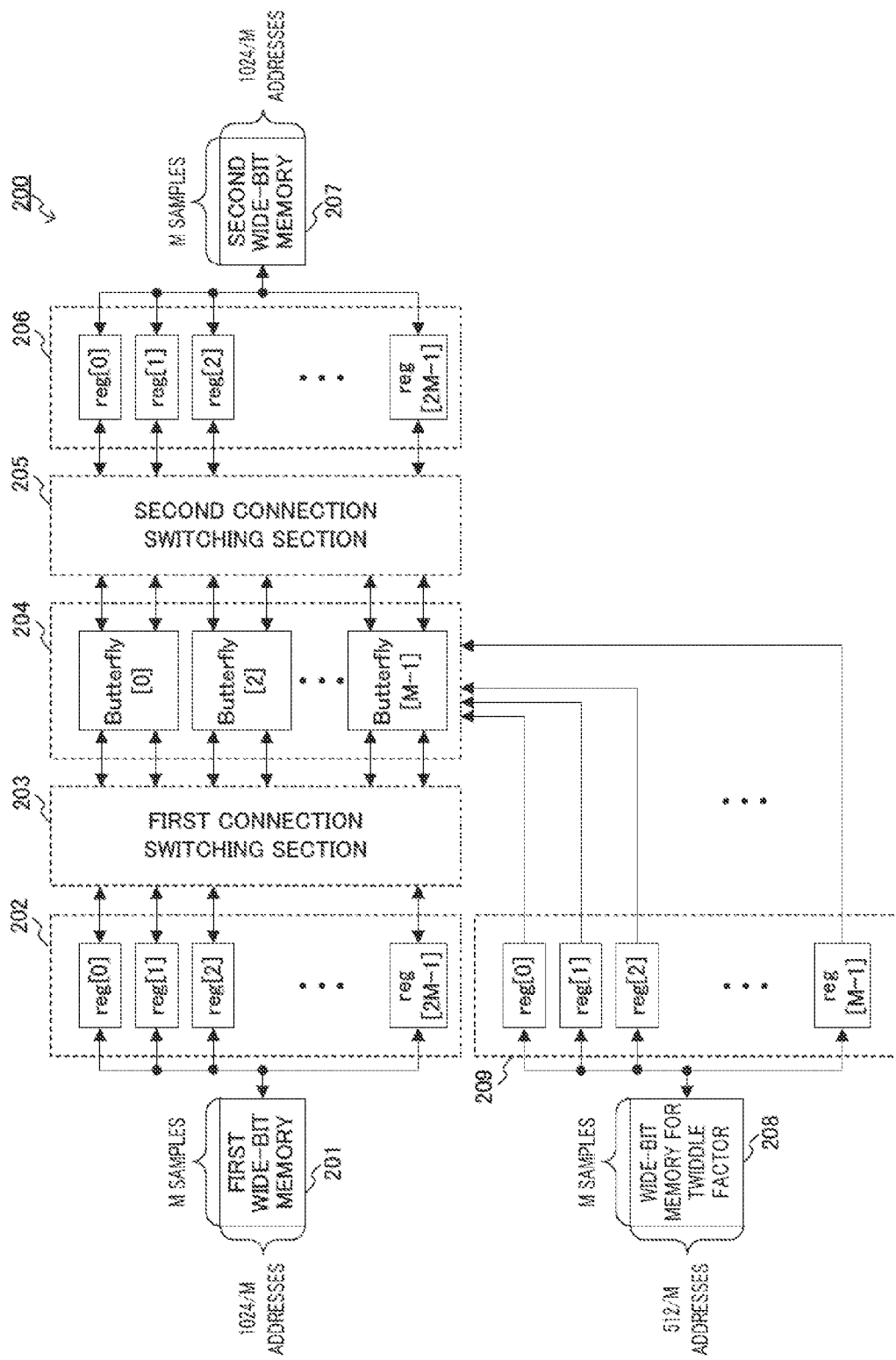
FIG. 5 is a block diagram illustrating the third example of the configuration of the signal conversion section according Embodiment 1 of the present invention.

FIG. 5 is a block diagram illustrating the third example of the configuration of signal conversion section 200.

As illustrated in FIG. 5, signal conversion section 200 includes twiddle-factor wide-bit memory 208 and twiddle-factor register group 209, in addition to the configuration illustrated in FIG. 3. Note that, butterfly operation section group 204 illustrated in FIG. 5 does not hold a twiddle factor.

Twiddle-factor wide-bit memory 208 is a memory with a large word size, capable of reading/writing signals (data) for M twiddle factors. Twiddle-factor wide-bit memory 208 has addresses allocated to each stage, and stores twiddle factors for the stages in advance.

Twiddle-factor register group 209 is composed of M registers each accessible to twiddle-factor wide-bit memory 208. Stated differently, twiddle-factor register group 209 simultaneously accesses wide-bit memories for twiddle factor 208 such that M twiddle factors are set in parallel. Subsequently, twiddle-factor register group 209 reads M corresponding twiddle factors from wide-bit memories for twiddle factor 208 for each stage, and passes the twiddle factors to appropriate butterfly operation sections in butterfly operations section group 204.

With this configuration, signal conversion section 200 does not have to include a memory for holding the twiddle factor for each butterfly operation section, allowing further reduction of the circuit size.

As described above, adaptive equalizer 100 according to Embodiment 1 includes a memory baying a large word size and signal conversion section 200 using a plurality of registers accessing the memory. With this configuration, adaptive equalizer 100 can suppress the increase in the circuit size and the increase in the operational clock frequency.

Since real-time processing is possible without requiring an operational clock frequency faster than necessary, consumption power can be reduced as well.

Note that, in regular FFT, it is necessary to rearrange signals into a bit-reverse relationship. Conventionally, the switching may be performed as the first process, or the last process, or the switching may be skillfully performed during the butterfly operation.

In the configuration of signal conversion section 200 according to Embodiment 1, in order to switch the signals into the bit-reverse relationship, the process may not be closed in samples collectively read, but switching with data read from another address will be necessary. Stated differently, in order to switch the signals into a bit-reverse relationship, it is necessary to add a register to temporarily holding the signals only for switching. This process increases the number of memory access, increasing the number of cycles.

In contrast, in an entire adaptive equalizer 100 according to Embodiment 1, a condition that the signal that has gone through FFT once always goes through IFFT is satisfied.

Accordingly, it is preferable that each signal conversion section 200 in adaptive equalizer 100 according to Embodiment 1 does not perform bit reverse on purpose.

Note that adaptive equalizer 100 may be configured such that butterfly operation section groups 204 provided for each stage are connected in series. In this case, first connection switching section 203 and second connection switching section 205 are not necessary. However, there is a possibility of increase in the circuit size.

Embodiment 2

In Embodiment 2 of the present invention, a decision feedback filter by time domain processing (hereafter referred to as a "time-domain filter") is provided, and a multiplier and a register in the signal conversion section are shared by a multiplier and a register in the time-domain filter.

Figure 6:
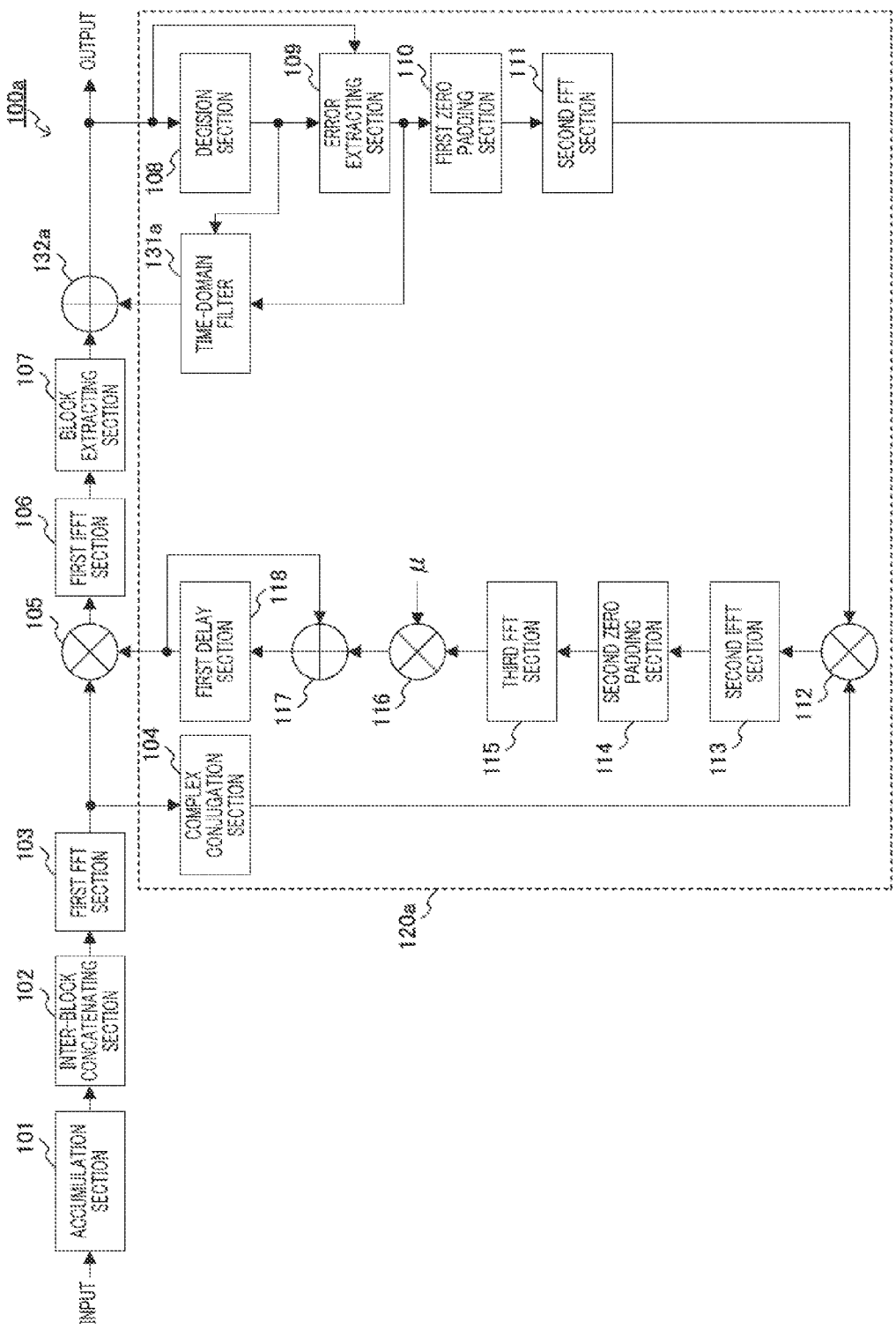
FIG. 6 is a block diagram illustrating the first example of the configuration of an adaptive equalizer according to Embodiment 2 of the present invention.

FIG. 6 is a block diagram illustrating the first example of the configuration of an adaptive equalizer according to Embodiment 2, and corresponding to FIG. 1 in Embodiment 1. The components identical to those in FIG. 1 are assigned with the same reference numerals as in FIG. 1, and the description for these components will be omitted.

In FIG. 6, first coefficient updating section 120a in adaptive equalizer 100a includes time-domain filter 131a and second adder 132a, in addition to the configuration illustrated in FIG. 1.

Time-domain filter 131a is a transversal filter, receives an output of decision section 108 and an output from error extracting section 109, and outputs a feedback signal in the time domain.

Second adder 132a adds an output from block, extracting section 107 and a feedback signal which is an output of time-domain filter 131a, and outputs a signal obtained. Note that, decision section 108 and error extracting section 109 receive an output of second adder 132a, instead of an output from block extracting section 107.

Figure 7:
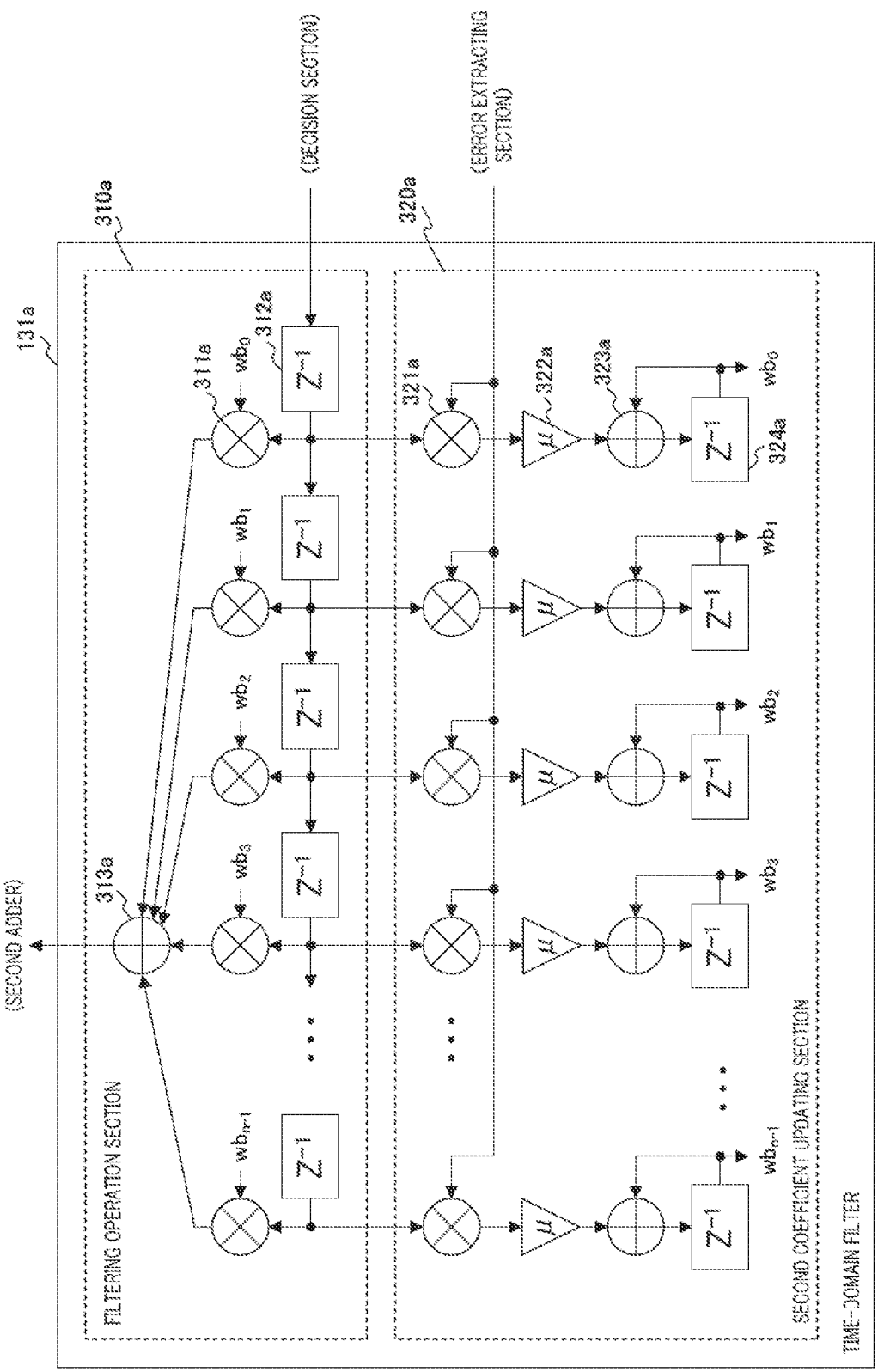
FIG. 7 is a block diagram illustrating an example of the configuration of a time-domain filter according to Embodiment 2 of the present invention.

FIG. 7 is a block diagram illustrating an example of the configuration of time-domain filter 131a.

In FIG. 7, time-domain filter 131a includes filtering operation section 310a and second coefficient updating section 320a.

Filtering operation section 310a includes N-tap coefficients, N multipliers 311a, N registers 312a, adder 313a, and others. Tap coefficients ($wb_0$, $wb_1$, $wb_2$, $wb_3$, ..., $wb_{N-1}$) in filtering operation section 310a are coefficients calculated by second coefficient updating section 320a.

Second coefficient updating section 320a includes N multipliers 321a, N step size coefficient ($\mu$) multiplier 322a, N adders 323a, N registers 324a, and others. Second coefficient updating section 320a operates as an adaptive filter, and calculates tap coefficients in filtering operation section 310a ($wb_0$, $wb_1$, $wb_2$, $wb_3$, ..., $wb_{N-1}$).

Adaptive equalizer 100a with the configuration described above can perform adaptive equalization in the time domain, further improving the reception performance.

In time-domain filter 131a, signals are collectively input for each block size. Stated differently, the operation cannot be performed until the adaptive equalization on the frequency domain in the earlier stage is complete, since an input signal does not exist. In other words, the adaptive equalization in the frequency domain and the adaptive equalization in the time domain can be performed simultaneously in parallel.

Taking advantage of this feature, adaptive equalizer 100a according to Embodiment 2 may use a part of a circuit used for the adaptive equalization in the frequency domain and the adaptive equalization in the time domain in common.

For example, adaptive equalizer 100a may use multiplier (not illustrated in FIG. 3) in each butterfly operation section in signal conversion section 200 (see FIG. 3), multiplier 311a in time-domain filter 131a, and multiplier 321a in common. Furthermore, adaptive equalizer 100a may use first and second register groups 202 and 206 in signal conversion section 200 (see FIG. 3), and registers 312a and 324a in time-domain filter 131a in common.

However, in order to use the circuits in common, the configuration for switching input/output of the circuit is necessary.

First, the configuration for using the multiplier in each of the butterfly operation section in signal conversion section 200, and multipliers 311a and 321a in time-domain filter 131a in common will be described.

Figure 8:
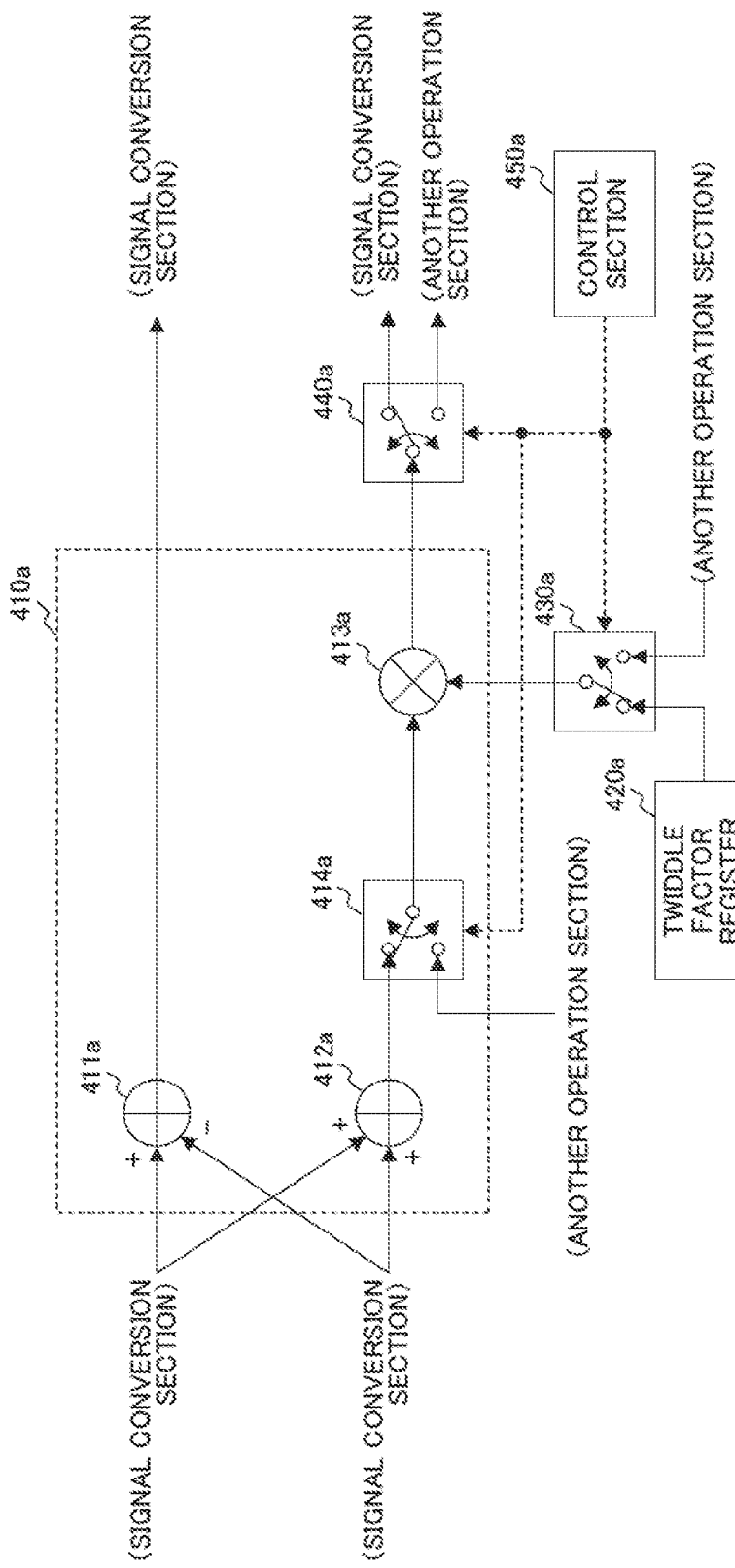
FIG. 8 is a block diagram illustrating an example of the configuration of around a butterfly operating section according to Embodiment 2 of the present invention.

FIG. 8 is a block diagram illustrating an example of the configuration around the butterfly operation section.

Butterfly operation section 410a illustrated in FIG. 8 corresponds to each butterfly operation section in butterfly operation section group 204 in signal conversion section 200 illustrated in Embodiment 1 (see FIG. 3).

FIG. 8, butterfly operation section 410a includes two adders 411a and 412a, and a multiplier 413a for multiplying a twiddle factor, provided at an output side of one of adders; adder 412a. Subsequently, butterfly operation section 410a further includes first switching section 414a between adder 412a and multiplier 413a.

Furthermore, signal conversion section (not illustrated) includes second switching section 430a between a twiddle factor register 420a holding the twiddle factor and multiplier 413a, and includes third switching section 440a on the output side of multiplier 413a. Signal conversion section further includes control section 450a controlling the switching of the connection status of first to third switching sections 414a, 430a, and 440a.

First switching section 414a switches one of the inputs of multiplier 413a between an output of adder 412a and an output of operating section other than signal conversion section (hereafter referred to as "another operating section").

Second switching section 430a switches the other input of multiplier 413a between the output of twiddle factor register 420a and an output of another operating section.

Third switching section 440a switches the output of multiplier 413a between connection switching section of signal conversion section and another operating section.

When performing FFT/IFFT operations, control section 450a controls first to third switching sections 414a, 430a, and 440a so as to establish a regular connection for butterfly operation section 410a. Stated differently, control section 450a performs control such that multiplier 413a in butterfly operation section 410a is used for the FFT/IFFT operations.

In contrast, when FFT/IFFT operations are not performed, control section 450a controls first to third switching sections 414a, 430a, and 440a such that the connection is reversed from the regular connection. More specifically, control section 450a controls first to third switching sections 414a, 430a, and 440a such that multiplier 413a in butterfly operation section 410a functions as multipliers 311a and 321a of time-domain filter 131a (see FIG. 7), for example.

The description for the configuration achieving the common-use of multiplier in each butterfly operation section in signal conversion section and multipliers 311a and 321a in time-domain filter 131a is as described above.

The following is the description of a configuration for achieving the sharing of the first and second register groups 202 and 206 in signal conversion section, and register 312a in filtering operation section 310a in time-domain filter 131a.

Figure 9:
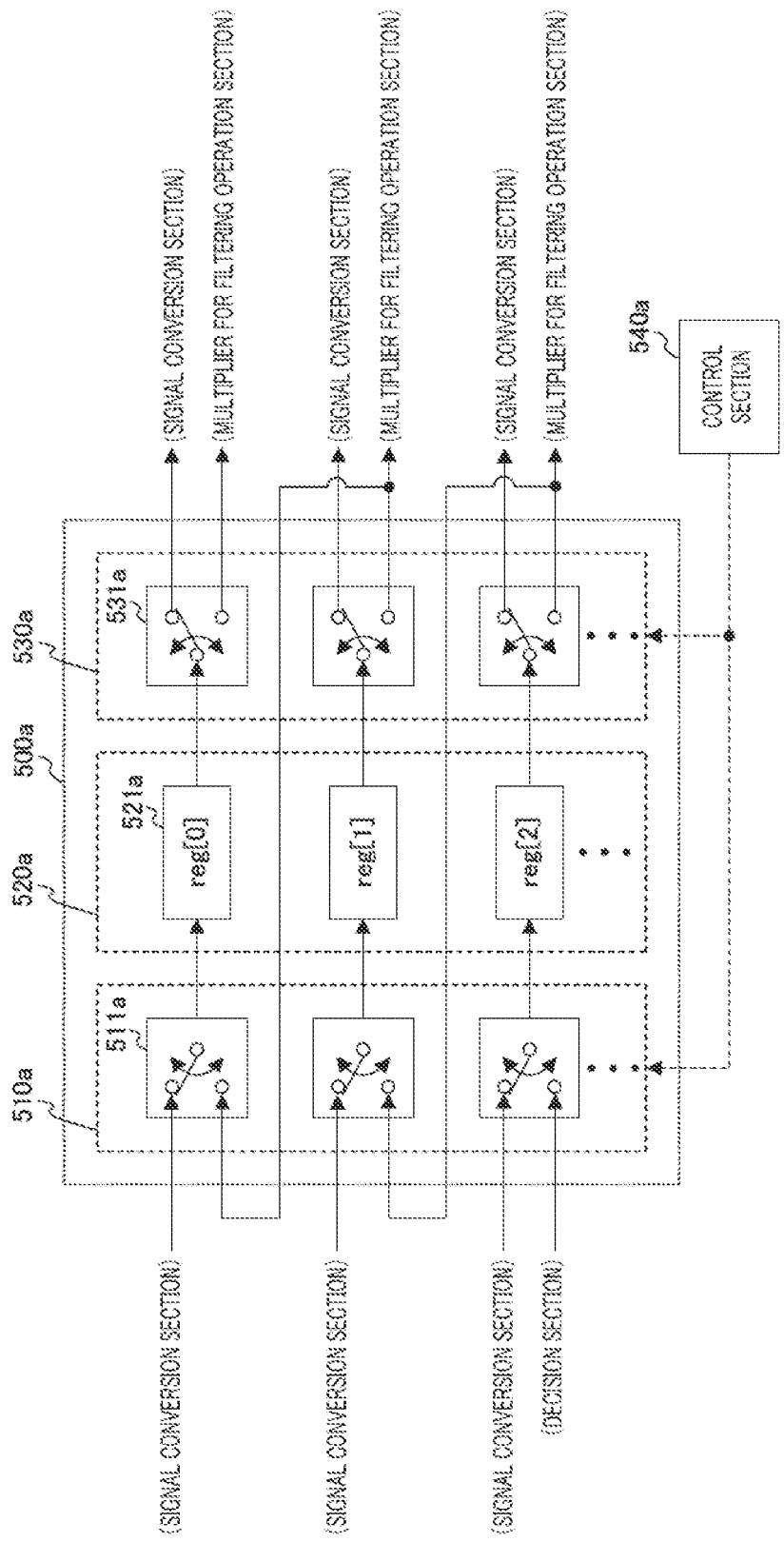
FIG. 9 is a block diagram illustrating the first example of the configuration around a register according to Embodiment 2 of the present invention.

FIG. 9 is a block diagram illustrating the first example of the configuration around a register.

In FIG. 9, register group placement section 500a includes register input side switching section group 510a, register group 520a, register output side switching section group 530a, and control section 540a. Register group 520a corresponds to first and second register groups 202 and 206 in signal conversion section 200 described in Embodiment 1 (see FIG. 3).

In FIG. 9, register input side switching section group 510a includes 2M register input side switching sections 511a, provided on the input side of 2M registers 521a in register group 520a on one-to-one basis. Register output side switching section group 530a includes 2M register output side switching sections 531a, provided on the output side of the registers 521a in the register group 520 on one-to-one basis.

One of register input side switching sections 511a switches the input of corresponding register 521a between signal conversion section 200 (see FIG. 3) and decision section 108 (see FIG. 6). Subsequently, another register input side switching section 511a switches the input to the corresponding register 521a between signal conversion section 200 (see FIG. 3) and an output from register 521a next to the corresponding register 521a.

Register output side switching section 531a switches the output of the corresponding register 521a between signal conversion section 200 (see FIG. 3) and an input side of register 521a next to the corresponding register 521a (input side of register input side switching section 511a).

When performing FFT/IFFT operation, control section 540a controls register input side switching section group 510a and register output side switching section group 530a so as to establish regular connection for register group 520a. More specifically, control section 540a uses register group 520a for FFT/IFFT operation.

In contrast, when performing operation for time-domain filter 131a, control section 540a controls register input side switching section group 510a and register output side switching section group 530a such that the connection is reversed from the regular connection. More specifically, control section 540a performs control such that registers 521 next to each other are connected and the entire register group 520a functions as a shift register. Control section 540a controls register input side switching section group 510a and register output side switching section group 530a such that register group 520a functions as register 312a in filtering operation section 310a in time-domain filter 131a (see FIG. 7).

The configuration for achieving the common use of the first and second register groups 202 and 206 in signal conversion section, and register 312a in filtering operation section 310a in time-domain filter 131a is as described above.

The following is the description of a configuration for achieving the common use of the first and second register groups 202 and 206 in signal conversion section, and register 324a in second coefficient updating section 320a in time-domain filter 131a.

Figure 10:
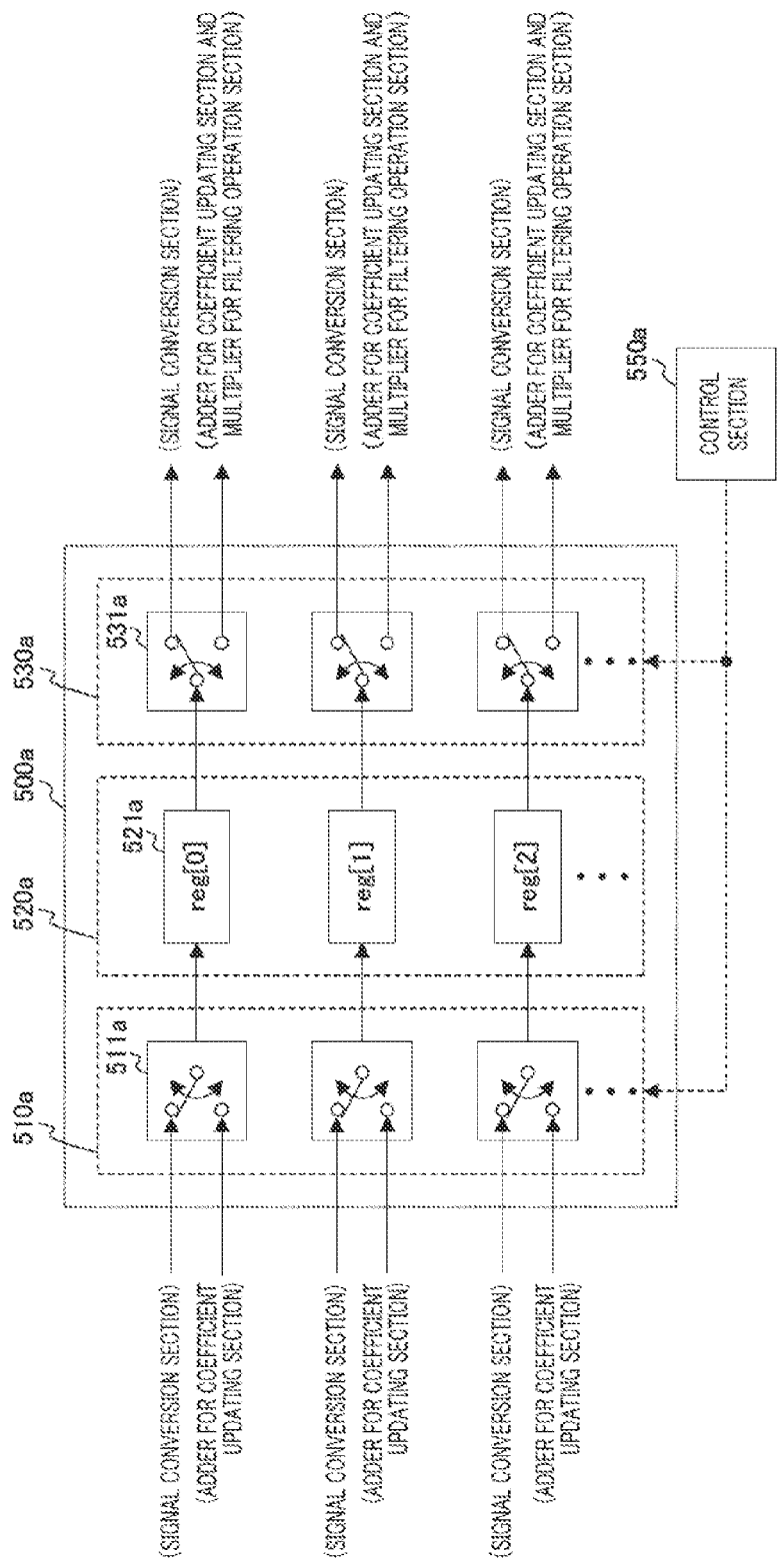
FIG. 10 is a block diagram illustrating the second example of the configuration around a register according to Embodiment 2 of the present invention.

FIG. 10 is a block diagram illustrating the second example of the configuration around a register, and corresponds to FIG. 9. The components identical to those in FIG. 9 are assigned with the same reference numerals as in FIG. 9, and the description for these components will be omitted.

In FIG. 10, each register input side switching section 511a switches the input of corresponding register 521a between signal conversion section 200 (see FIG. 3) and adder 323a in second coefficient updating section 320a in time-domain filter 131a (see FIG. 7).

Register output side switching section 531a switches an output of corresponding register 521a between (i) signal conversion section 200 (see FIG. 3) and (ii) adder 323a in second coefficient updating section 320a and multiplier 311a in filtering operation section 310a (see FIG. 7).

When performing FFT/IFFT operation, control section 550a controls register input side switching section group 510a and register output side switching section group 530a so as to establish the regular connection described above.

In contrast, when performing operation for time-domain filter 131a, control section 550a controls register input side switching section group 510a and register output side switching section group 530a such that the connection is reversed from the regular connection. Control section 550a controls register input side switching section group 510a and register output side switching section group 530a such that register group 520a functions as register 324a in second coefficient updating section 320a in time-domain filter 131a (see FIG. 7).

The configuration for achieving the common use of the first and second register groups 202 and 206 in signal conversion section, and register 324a in second filtering operation section 320a in time-domain filter 131a is as described above.

Note that it is necessary for register 324a in second coefficient updating section 320a to hold coefficient values in the past. Accordingly, as described in Embodiment 2, when using a register in the signal conversion section and register 324a in second coefficient updating section 320a in common, it is necessary to accumulate data in the register in a memory before the switching, and reads the data from the memory again after the switching.

Figure 11:
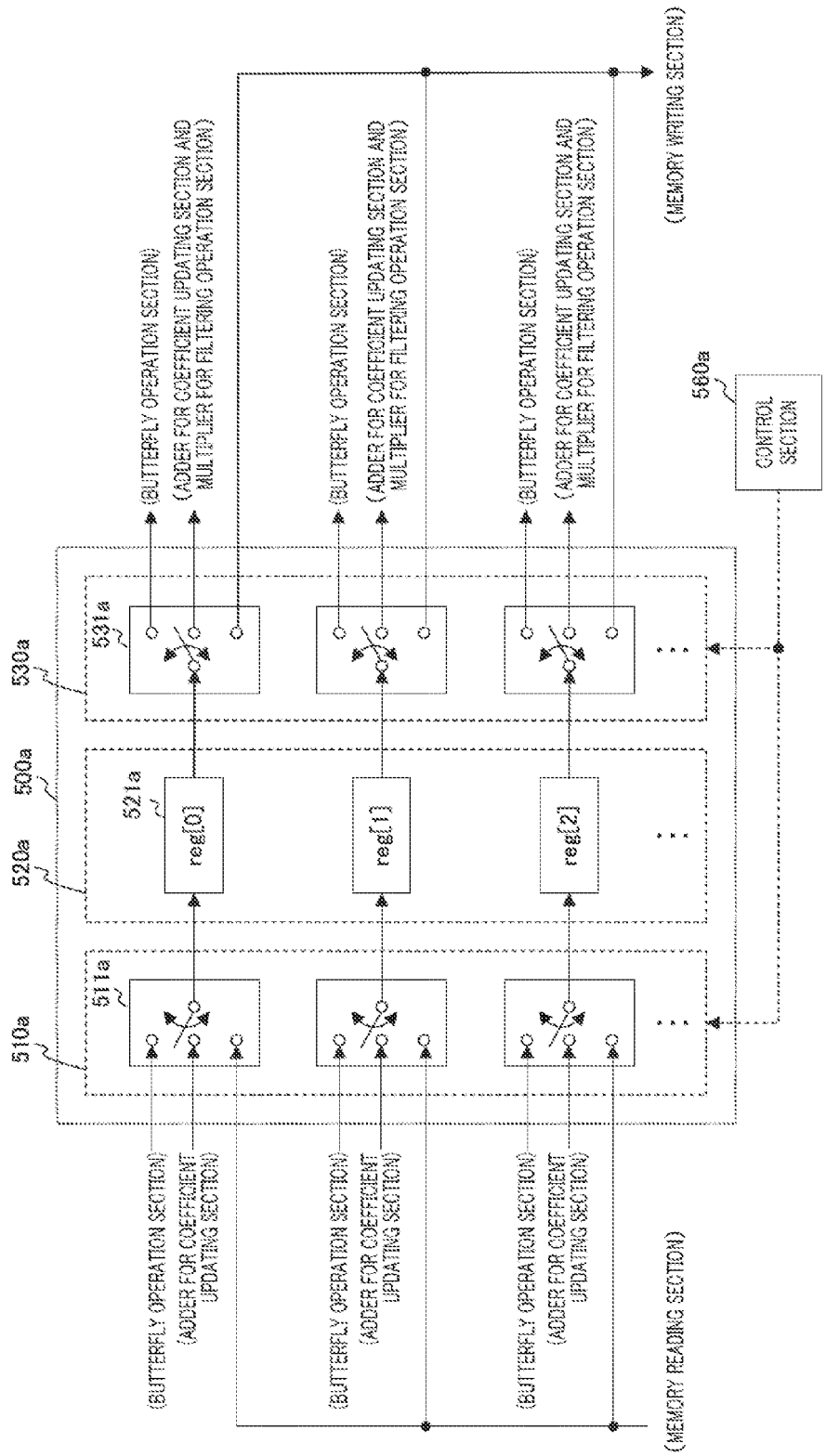
FIG. 11 is a block diagram illustrating the third example of the configuration around a register according to Embodiment 2 of the present invention.

In this case, as illustrated in FIG. 11, register input side switching section 511a connects, to input side of corresponding register 521a, an output side of a memory reading section in a coefficient value memory for holding a previous coefficient value (neither of them is illustrated) after switching. Register output side switching section 531a connects the output side of corresponding register 521a after switching to a memory writing section in the coefficient value memory (not illustrated). Control section 560a performs the control in the same manner as control section 550a described above. Control section 560a also controls register input side switching section group 510a and register output side switching section group 530a such that the coefficient values are read from/written on the coefficient value memory when performing the operation for time-domain filter 131a.

With the configuration described above, adaptive equalizer 100a can improve the reception performance while suppressing the increase in the circuit size.

Note that, the frequency of feedback in the time domain (frequency of coefficient update for time-domain filter 131a) may be once in each block size, in the same manner as the frequency of feedback in the frequency domain (frequency of coefficient update by first coefficient updating section 120a in FIG. 6). In this case, second coefficient updating section 320a in time-domain filter 131a becomes not necessary.

Figure 12:
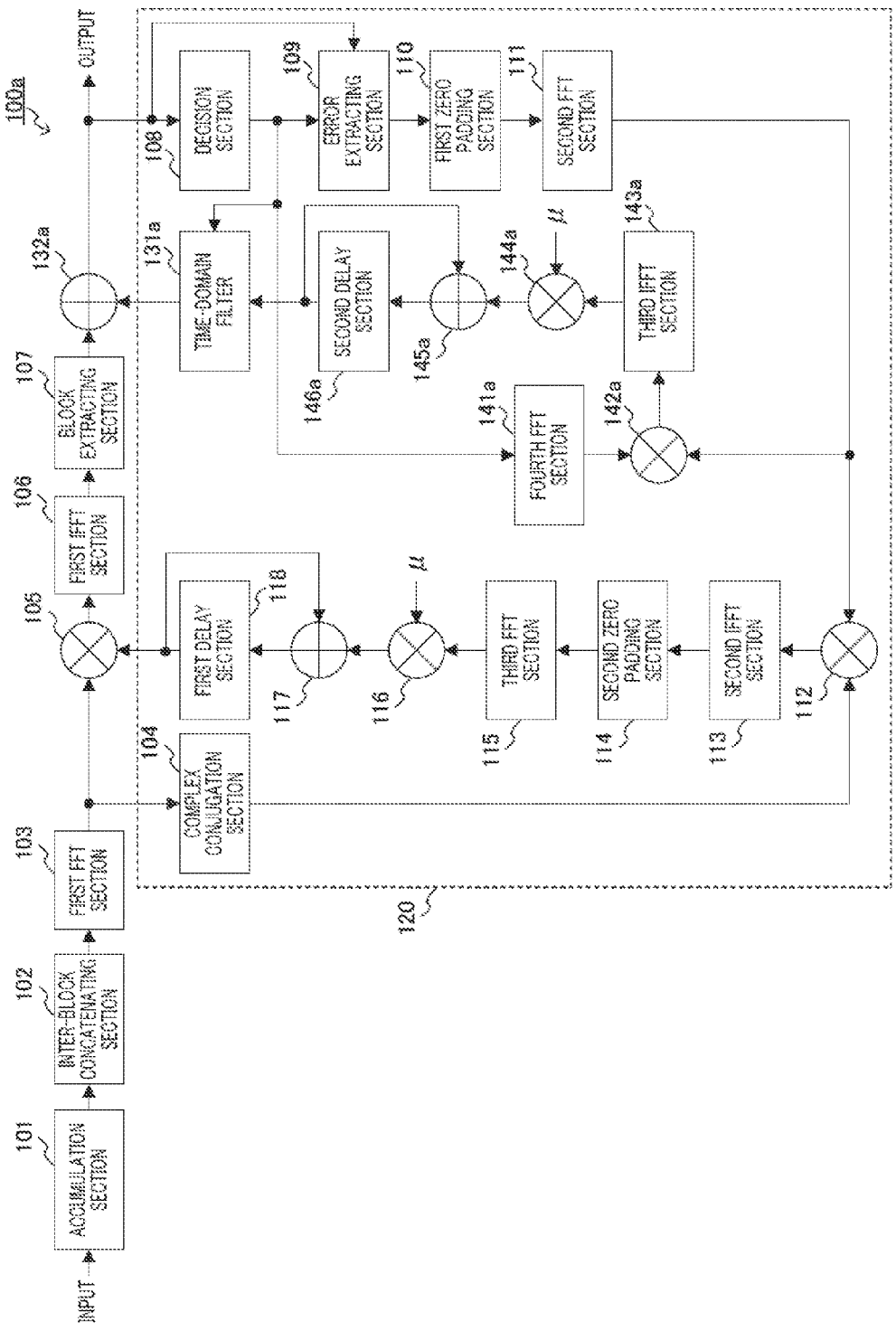
FIG. 12 is a block diagram illustrating the second example of the configuration of an adaptive equalizer according to Embodiment 2 of the present invention.

FIG. 12 is a block diagram illustrating the second example of the configuration around adaptive equalizer 100a, and corresponds to FIG. 6. The components identical to those in FIG. 6 are assigned with the same reference numerals as in FIG. 6, and the description for these components will be omitted.

Adaptive equalizer 100a illustrated in FIG. 12 does not include second coefficient updating section 320a illustrated in FIG. 7 in time-domain filter 131a. As illustrated in FIG. 12, adaptive equalizer 100a includes fourth FFT section 141a, fourth multiplier 142a, third IFFT section 143a, fifth multiplier 144a, third adder 145a, and second delay section 146a, instead of second coefficient updating section 320a.

Fourth FFT section 141a performs FFT (conversion to the frequency domain) on an output from decision section 108 (feedback signal after the decision), and outputs the signal obtained.

Fourth multiplier 142a multiplies the output from second FFT section 111 and output from fourth FFT section 141a, and outputs the signal obtained.

Third IFFT section 143a performs IFFT on the output from fourth multiplier 142a (error component from decision value), and outputs the signal obtained.

Fifth multiplier 144a multiplies the output from third IFFT section 143a and a step size for updating coefficient (μ), and outputs the signal obtained.

Third adder 145a adds the output from fifth multiplier 144a and the output from second delay section 146a in a later stage, and outputs the signal obtained.

Second delay section 146a delays the output from third adder 145a, and outputs, to time-domain filter 131a, the delayed output as a coefficient for the adaptive equalizer converted into the time domain.

Stated differently, third adder 145a and second delay section 146a function as an accumulation section that accumulates the output from fifth multiplier 144a.

With the configuration described above, adaptive equalizer 100a can reduce the number of multiplier and the registers necessary for a transversal filter even when a number of coefficients must be held in the feedback section, thereby reducing the circuit size.

Embodiment 3

Embodiment 3 of the present invention is an example in which a wide-bit memory in the signal conversion section is used in common with a memory in another section.

In the case of OFDM demodulation section (multi-carrier demodulation section), only one FFT operation is necessary for performing basic demodulation, and there is no feedback system that requires the adaptive process. Accordingly, in the OFDM demodulation section, operations may be simultaneously performed in a plurality of circuits in pipeline, and real-time processing can be performed without using the configuration of the signal conversion section according to the present invention.

In contrast, when estimating a channel, the OFDM demodulation section requires a relatively complex memory access using a scattered pilot signal or others that is regularly positioned, for example. Stated differently, a memory with a large word size is essential for the OFDM demodulation section.

In addition, it is not necessary to perform the reception process by the OFDM demodulation section and the reception process by the ATSC demodulation section at the same time.

Accordingly, in a reception apparatus that includes a memory in the OFDM demodulation section, the increase in the circuit size in the entire apparatus by adding adaptive equalizer 100 by using the memory essential for the OFDM demodulation section and the memory in adaptive equalizer 100 in common.

The OFDM demodulation section is a method for converting a time-domain signal into a frequency-domain signal by FFT and equalizing the signal based on a channel estimation value. Accordingly, the configuration of the OFDM demodulation section is significantly different from the adaptive equalizer, and there is not much in common between the two sections. Accordingly, when implementing a circuit compliant to the ATSC and OFDM systems, a large area was necessary with the conventional technique, making the increase in the cost inevitable.

In this regard, a reception apparatus adapting adaptive equalizer 100 according to Embodiment 3 can further reduce the circuit size of a circuit compliant to both the ATSC and OFDM systems by sharing the memory.

However, in order to achieve the common use of the memory, it is necessary for the ATSC to collectively access a plurality of samples in the wide-bit memory, and for the OFDM to access each sample. In view of these points, the configuration that allows switching in the access method will be described.

Figure 13:
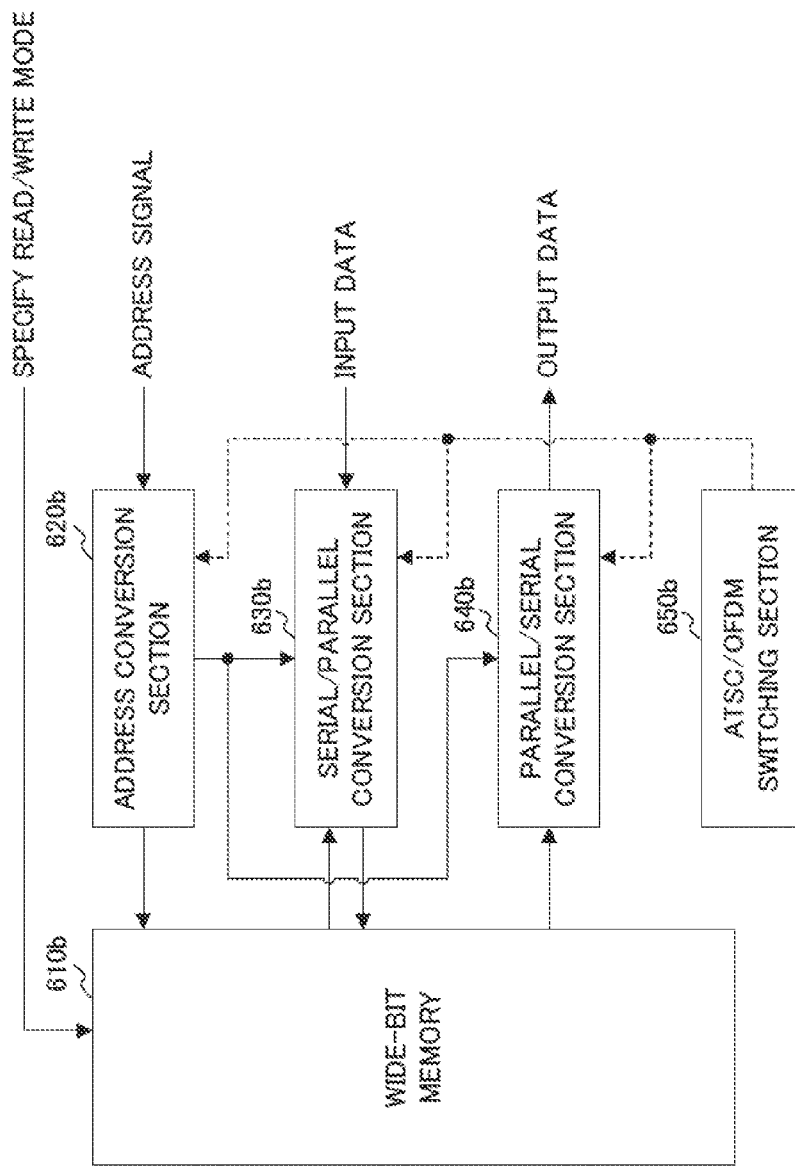
FIG. 13 is a block diagram illustrating the first example of the configuration around a memory in an adaptive equalizer according to Embodiment 3 of the present invention.

FIG. 13 is a block diagram illustrating the first example of the configuration around a memory according to Embodiment 3.

As illustrated in FIG. 13, the adaptive equalizer according to Embodiment 3 (not illustrated) includes address conversion section 620b, serial/parallel conversion section 630b, parallel/serial conversion section 640b, and ATSC/OFDM switching section 650b. They are data input/output section for wide-bit memory 610b.

Wide-bit memory 610b corresponds to first wide-bit memory 201 and second wide-bit memory 207 described in Embodiment 1 (see FIG. 3). When receiving input of a signal specifying reading mode/writing mode, an address signal, and a data signal, wide-bit memory 610b reads/writes data based on the signals.

In the ATSC mode for performing the operation for the ATSC, address conversion section 620b inputs an address signal to wide-bit memory 610b without conversion.

Furthermore, when in the OFDM mode for performing the operation for the OFDM, address conversion section 620b shifts the address signal to the right by Log 2 (M) bits, and inputs only the high-order bit to wide-bit memory 610b. Subsequently, address conversion section 620b inputs a bit cut off by the shift to the right to serial/parallel conversion section 630b and parallel/serial conversion section 640b. Stated differently, serial/parallel conversion section 630b and parallel/serial conversion section 640b specifies a location of the bit in data collectively held for M samples.

When in the ATSC mode, serial/parallel conversion section 630b inputs the input data to wide-bit memory 610b without conversion.

In addition, when in the OFDM mode, serial/parallel conversion section 630b overwrites the input data on data at the location specified by address conversion section 620b in wide-bit memory 610b. Here, it is necessary to write back data at the other locations that are not specified. Accordingly, serial/parallel conversion section 630b first reads the data at the specified address, and writes back only the data at the specified location in the data for M samples that have been read by overwriting the data with the input data.

When in the ATSC mode, parallel/serial conversion section 640b outputs data for M samples output from wide-bit memory 610b without conversion.

In addition, when in the OFDM mode, parallel/serial conversion section 640b extracts the data at the location specified by address conversion section 620b among data for M samples output from wide-bit memory 610b, and uses the data as the output data.

ATSC/OFDM switching section 650b switches the ATSC mode/OFDM mode on address conversion section 620b, serial/parallel conversion section 630b, and parallel/serial conversion section 640b.

With the configuration, the adaptive equalizer can use the wide-bit memory in the ATSC system and the OFDM system in common. Stated differently, the adaptive equalizer according to Embodiment 3 can implement a small-sized demodulation section compliant to multi-mode by using a memory in the OFDM demodulation section for single-carrier demodulation such as the ATSC as well.

Note that, the configuration illustrated in FIG. 13 is a configuration compliant to random access and sequential access to wide-bit memory 610b.

Figure 14:
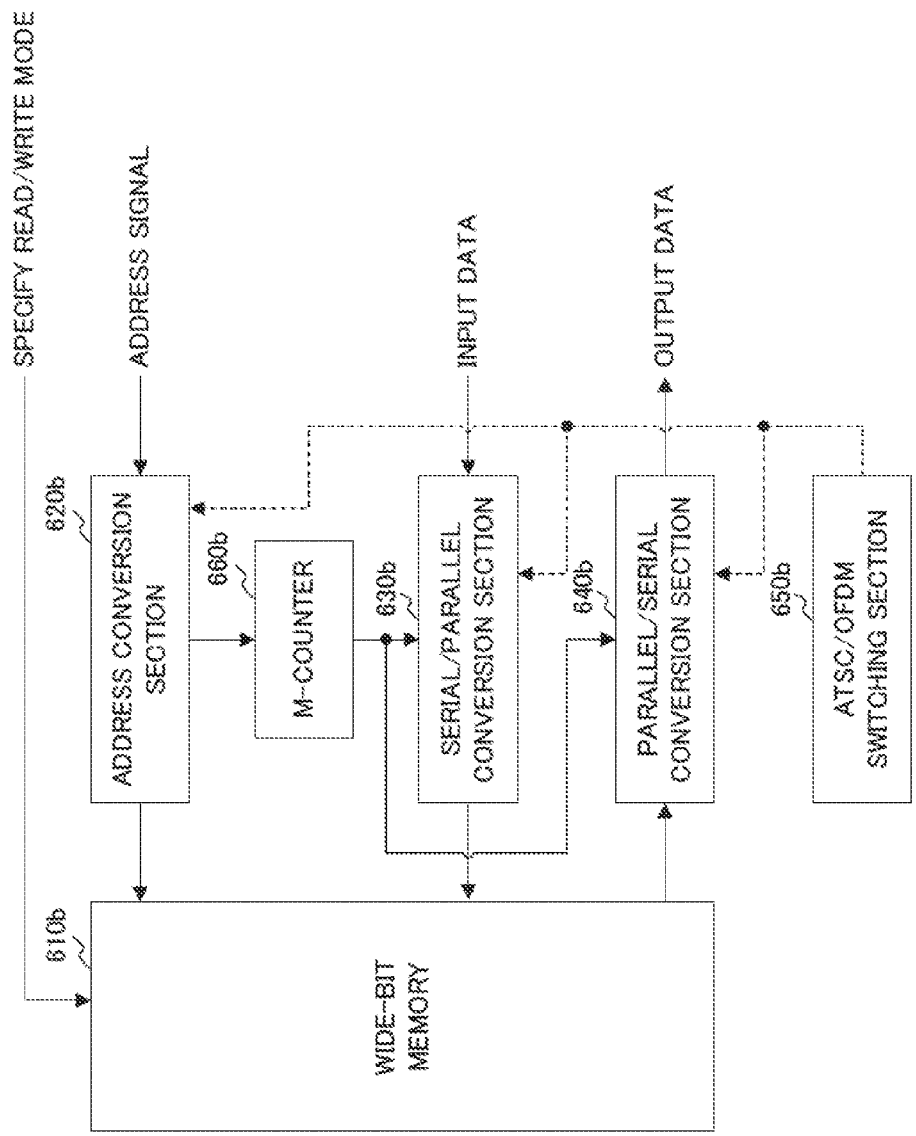
FIG. 14 is a block diagram illustrating the second example of the configuration around a memory in the adaptive equalizer according to Embodiment 3 of the present invention.

In contrast, when the memory access is limited to the sequential access, a configuration capable of reducing the frequency of serial/parallel conversion is possible, as illustrated in FIG. 14.

As illustrated in FIG. 14, the adaptive equalizer according to Embodiment 3 (not illustrated) further includes M counter 660b as data input/output section in wide-bit memory 610b.

In this configuration, address conversion section 620b outputs a bit cutoff the by the shift to the right to M counter 660b.

M counter 660b start counting when the input bit (cutoff bit) is zero. Subsequently, M counter 660b inputs a signal indicating the timing to serial/parallel conversion section 630b and parallel/serial conversion section 640b each time the counter value is M.

Serial/parallel conversion section 630b parallelizes sequential input data, and writes the parallelized data to wide-bit memory 610b, based on the signal input timing from M counter 660b (that is, once for every M samples).

Parallel/serial conversion section 640b accesses wide-bit memory 610b and reads the data, based on the signal input timing from M counter 660b in the same manner (that is, once for every M samples). Subsequently, parallel/serial conversion section 640b sequentially outputs the data read for one sample as the output data.

With this configuration, the number of access on wide-bit memory 610b can be suppressed, contributing to the reduction in the power consumption.

Note that adaptive equalizer may have a configuration in combination with the configuration illustrated in FIG. 13 and the configuration illustrated in FIG. 14. Subsequently, the adaptive equalizer may further include a control section that switches the configuration of the data input/output section depending on whether the access on the wide-bit memory 610b is random or sequential.

In addition, the aspect of sharing the circuit in the signal conversion section is not limited to the example in Embodiments described above. For example, the adaptive equalizer may use first to third multipliers and a multiplier in the time-domain filter in common.

Embodiment 4

Embodiment 4 of the present invention relates to an example in which the update frequency of filtering coefficient is partially set to be shorter than the block size.

According to the conventional technology, if the change in the propagation channel is small, it is assumed that the degradation from the method for updating the filtering coefficient per symbol is limited, even if the process is collectively performed for the block size described above (for example, see NPL1). However, when the adaptive equalizer is in use in a real environment, the adaptive equalizer is affected by factors other than the equalization process such as synchronization error in retiming and thus the capacity is degraded if all of tap coefficients are updated per block size. More specifically, when a close multipath wave with a large D/U is present, the influence is notable. As a general retiming method corresponding to a single-carrier method such as the ATSC includes extracting the timing component through a tank limiter circuit after square-law detection. When a close multipath wave with a large D/U is present, there is a case that the signal component in most of the band for extracting the timing component is canceled due to the relationship of phases of the close multipath wave and a desired wave, resulting in a relatively large error in a retiming signal.

In order to achieve sufficient equalization performance under such a poor propagation condition, main wave and taps nearby (for example, 16 taps before and after the main wave) that largely affects the reception performance are focused in Embodiment 4. More specifically, in Embodiment 4, filtering coefficients are updated more frequently than in the block size (for example, for every symbol) in the main wave and taps nearby (for example, 16 taps before and after the main wave).

Figure 15:
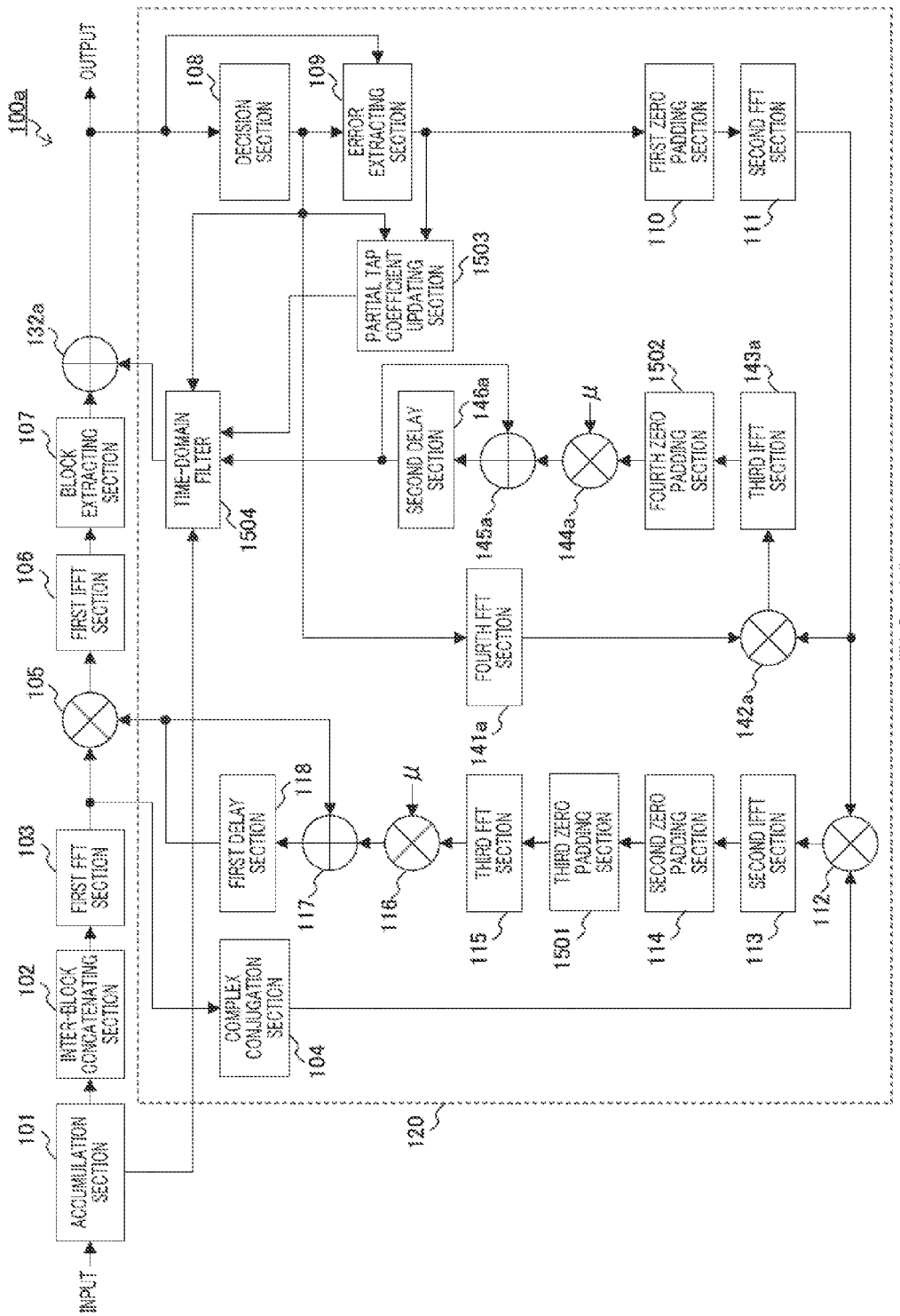
FIG. 15 is a block diagram illustrating a configuration of an adaptive equalizer according to Embodiment 4 of the present invention.

FIG. 15 is a block diagram illustrating configuration of adaptive equalizer 100a according to Embodiment 4.

In FIG. 15, adaptive equalizer 100a includes, in addition to adaptive equalizer 100a in FIG. 12, third zero padding section 1501, fourth zero padding section 1502, and partial tap coefficient updating section 1503. Furthermore, adaptive equalizer 100a includes time-domain filter 1504 receiving a reception signal as input in addition to a decision feedback signal, replacing time-domain filter 131a receiving only the decision feedback signal as input.

Third zero padding section 1501 always set the part corresponding to tap coefficients for increasing the update frequency, among taps for cancelling as preceding wave before the tap of the main wave in output from second zero padding section 114. More specifically, when there are 1024 FFT points and the tap count of the feed forward section is 300 taps, it is assumed that adaptive equalizer 100a increases update frequency only for the main wave taps and immediately preceding 9 taps. In this case, second zero padding section 114 pads zero to addresses 301 to 1024 where the tap coefficients are not present. In contrast, third zero padding section 1501 pads zero to 10 taps for increasing update frequency (addresses 291 to 300).

In regular taps where the update frequency is per block, the processing is performed as described in Embodiments 1 to 3. In contrast, in Embodiment 4, in a tap for increasing the update frequency, third zero padding section 1501 pads zero such that the regular process is disabled to prevent overlapping process of regular process per block and process performed by increasing the update frequency. Note that, when the overlapping process is performed, disturbance factor in the adaptive process is generated in a cycle per block, degrading the equalization performance.

Third zero padding section 1501 outputs the signal obtained to third FFT section 115.

In the output from third IFFT section 143a, fourth zero padding section 1502 always pads zero to tap coefficients for increasing the update frequency, among taps for canceling a delay wave after the tap of the main wave, in the output from third IFFT section 143a. With regard to updating tap coefficients for increasing the update frequency, partial tap coefficient updating section 1503 is provided for performing conventional time-domain processing, instead of the frequency-domain processing per block. The role of fourth zero padding section 1502 is to prevent the overlap in the process performed per block and the process for updating partial tap coefficient increasing the updating frequency, in the feedback filtering operation section. Accordingly, fourth zero padding section 1502 disables the regular process per block. Note that, when the overlap between the regular process per block and the process performed by increasing the update frequency occurs, a disturbance factor is generated in adaptive process per block, degrading the equalization performance.

Fourth zero padding section 1502 outputs the signal obtained to fifth multiplier 144a.

Partial tap coefficient updating section 1503 has the same configuration as coefficient updating section 320a in FIG. 7, and multiplies a time constant μ to a result obtained by multiplying a data sequence after decision input from decision section 108 and decision error component input from error extracting section 109. Subsequently, partial tap coefficient updating section 1503 derives a new tap coefficient by adding the result to the tap coefficient before an update. Partial tap coefficient updating section 1503 updates the filtering coefficient for each symbol by performing the update each time the decision data is obtained. Partial tap coefficient updating section 1503 outputs the obtained filtering coefficient to time-domain filter 1504. The input signal in time-domain filter 1504 is output from accumulation section 101. However, the input signal is delayed so as to correspond to the tap position for increasing the update frequency.

As described above, all of operations for taps having increased update frequency are performed by partial tap coefficient updating section 1503. In addition, third zero padding section 1501 and fourth zero padding section 1502 are provided for not causing overlap between the regular process performed per block and the process performed with increased update frequency.

Figure 16:
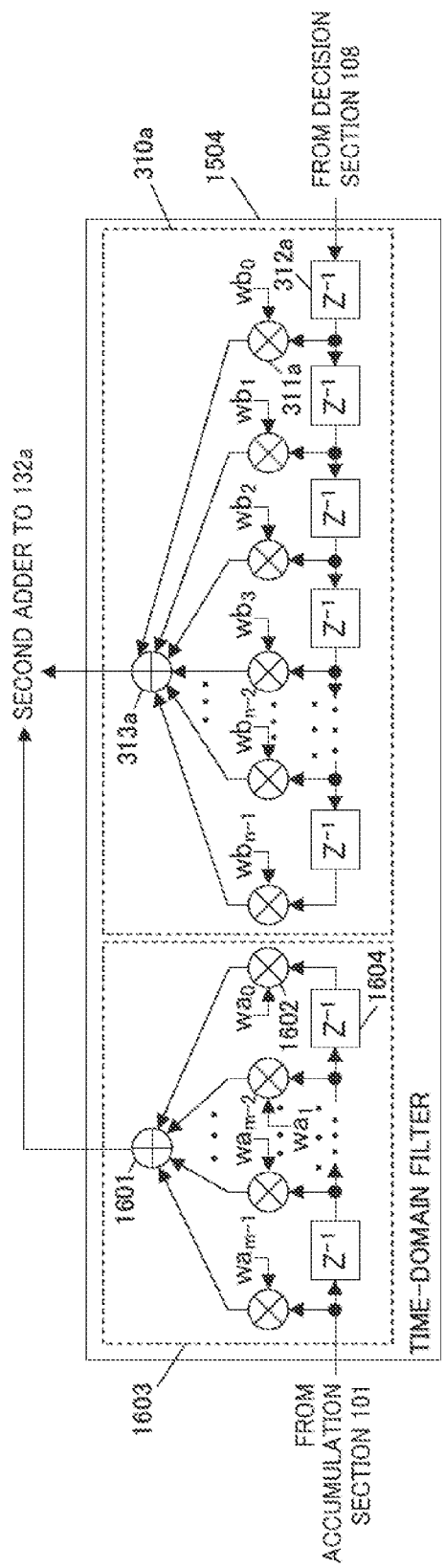
FIG. 16 is a block diagram illustrating a configuration of a time-domain filter according to Embodiment 4 of the present invention.

Time-domain filter 1504 includes filtering operation section 1603 receiving a reception signal as input, in addition to filtering operation section 310a in FIG. 7 which receives a decision feedback signal as input as illustrated in FIG. 16. Note that, in FIG. 16, the components identical to those in FIG. 7 are assigned with the same reference numerals, and description for these components is omitted.

Filtering operation section 1603 includes M-tap coefficients, and includes M multipliers 1602, M registers 1604, adder 1601, and others. Filtering operation section 1603 has the same configuration as filtering operation section 310a. However, with regard to the tap count, the tap count is limited to the total of the taps for the main wave and the taps for canceling the preceding wave preceding the taps for the main wave.

With regard to filtering coefficient, filtering operation section 1603 sets the output of partial tap coefficient updating section 1503. Filtering operation section 310a sets the output of partial tap coefficient updating section 1503 for the tap coefficient for which the update frequency is increased in the same manner, and sets the output of second delay section 146a for the tap coefficient to be updated per block.

In Embodiment 4, in the time-domain filter, the decision feedback equalization is performed by updating the filtering coefficient in a frequency shorter than the block size, only on the output of the main wave that significantly affects the reception performance and the output of the tap nearby. With this, according to Embodiment 4, sufficient equalization performance without degradation can be achieved even in a poor propagation environment.

The adaptive equalizer according to the present invention is an adaptive equalizer that performs adaptive equalization on a time-domain signal in a frequency domain, comprising a signal conversion section that performs at least one of a fast Fourier transform and an inverse fast Fourier transform, wherein the signal conversion section including: a memory capable of reading and writing signals for 2M samples, where M is a natural number; 2M registers accessible to the memory; M butterfly operation sections; and a switching control section that switches a connection state between the 2M registers and the M butterfly operation sections.

In the configuration described above, the adaptive equalizer according to the present invention, the signal conversion section includes two pairs of the memory and the 2M registers; and the switching control section switches a connection state (i) between the 2M registers in one of the two pairs and the M butterfly operation sections and (ii) between the 2M registers in the other of the two pairs and the M butterfly operation sections, such that a role of the memory is switched between a memory for output and a memory for input for each stage of the fast Fourier transform and the inverse fast Fourier transform.

In the configuration described above, the adaptive equalizer according to the present invention includes: a first signal conversion section as the signal conversion section that performs the fast Fourier transform; and a second signal conversion section as the signal conversion section that performs the inverse fast Fourier transform on a signal on which the fast Fourier transform is performed by the first signal conversion section, wherein: the first signal conversion section does not perform a bit-reversal permutation in the fast Fourier transform; and the second signal conversion section does not perform a bit-reversal permutation in the inverse fast Fourier transform.

In the configuration described above, the adaptive equalizer according to the present invention, the signal conversion section further includes: a twiddle-factor memory that stores twiddle factors in each stage of the fast Fourier transform and the inverse fast Fourier transform, and that is capable of reading signals for M samples; and M twiddle-factor registers that are accessible to the twiddle-factor memory, and that obtains the twiddle factors and passes the twiddle factors to the M butterfly operation sections.

In the configuration described above, the adaptive equalizer according to the present invention further includes: an accumulation section that receives input of a signal in the time domain and sequentially accumulates the signals for a predetermined block size; an inter-block concatenating section that concatenates a block accumulated last time and a newest block; a first fast Fourier transform section as the signal conversion section that performs the fast Fourier transform on output from the inter-block connecting section; a first multiplier that multiplies output from the first fast Fourier transform section and a coefficient for adaptive equalizer converted into the frequency domain; a first inverse fast Fourier transform section as the signal conversion section that performs the inverse fast Fourier transform on output from the first multiplier; a block extracting section that extracts a newest block of signal series from the output from the first inverse fast Fourier transform section; an error extracting section that extracts an error from output from the first inverse fast Fourier transform section to an ideal signal point; a first zero padding section that pads zero to a series of the error extracted, except for a part denoting desired tap coefficients; a second fast Fourier transform section as the signal conversion section that performs the fast Fourier transform on output from the first zero padding section; second multiplier that multiplies complex conjugation of output from the first fast Fourier transform section and output from the second fast Fourier transform section; a second inverse first Fourier transform section as the signal processing, section that performs inverse fast Fourier transform on a multiplication result of the second multiplier; a second zero padding section that pads zero to output from the second inverse fast Fourier transform section, except for a part denoting desired tap coefficients; a third fast Fourier transform section as the signal processing section that performs the fast Fourier transform on output from the second zero padding section; a third multiplier that multiplies output from the third fast Fourier transform section and a predetermined coefficient; and an accumulation section that accumulates output from the third multiplier.

In the configuration described above, the adaptive equalizer according to the present invention further includes a time-domain filter section that performs decision-feedback equalization on output from the first inverse fast Fourier transform section, in which at least one of multipliers used for butterfly operation sections in the first to third fast Fourier transform sections and the first and second inverse fast Fourier transform sections is used in common with a multiplier for convolution operation by the time-domain filter section.

In the configuration described above, the adaptive equalizer according to the present invention, at least one of multipliers used for butterfly operation sections in the first to third fast Fourier transform sections and the first and second inverse fast Fourier transform sections is used in common with a multiplier for the first to third multipliers.

In the configuration described above, the adaptive equalizer according to the present invention further includes a time-domain filter section that performs decision-feedback equalization on output from the first inverse fast Fourier transform section, in which at least one of the registers in the first to third fast Fourier transform section and the first and second inverse fast Fourier transform section is used in common with a register in the time-domain filter section.

In the configuration described above, the adaptive equalizer according to the present invention a time-domain filter section that performs decision-feedback equalization on at least the output from the first inverse fast Fourier transform section of the main wave, using a filtering coefficient updated in a frequency shorter than the block size, a time-domain filter section that performs decision-feedback equalization on at least the output from the first inverse fast Fourier transform section of the main wave, using a filtering coefficient updated in a frequency shorter than the block size.

In the configuration described above, the adaptive equalizer according to the present invention is provided in a reception apparatus including a multi-carrier demodulation section; and the memory is used in common with a memory in the multi-carrier demodulation section.

In the configuration described above, the adaptive equalizer according to the present invention further includes: an input/output section that includes an address conversion section, a serial/parallel conversion section, and a parallel/serial conversion section, and controls input and output of signals to and from the memory; and a control section that switches configuration of the input/output section depending on whether a method for accessing the memory is random or sequential.

In the configuration described above, the adaptive equalizer according to the present invention, in a writing mode when the method for accessing the memory is random, the input/output section reads data for 2M samples from the memory before writing the data and overwrites the data only on a predetermined location of the memory.

The disclosure of Japanese Patent Application No. 2011-227922, filed on Oct. 17, 2011, including the specification, drawings and abstract, is incorporated herein by reference in its entirety.

INDUSTRIAL APPLICABILITY

The present invention is effective as an adaptive equalizer that performs adaptive equalization on a time-domain signal in the frequency domain, which is capable of suppressing the increase in the circuit size and the operational clock frequency. In particular, the present invention is suitable for an adaptive equalizer for a reception apparatus compliant to multi-value VSB (Vestigial Sideband) modulation adapted to the ATSC and others. The present invention is also suitable for digital adaptive equalizers such as audio echo canceller, noise canceller and others that requires a number of taps, in addition to an adaptive equalizer for wireless transmission.

REFERENCE SIGNS LIST 100, 100a Adaptive equalizer
101 Accumulation section
102 Inter-block concatenating, section
103 First FFT section
104 Complex conjugation section
105 First multiplier
106 First IFFT section
107 Block extracting section
108 Decision section
109 Error extracting section
110 First zero padding section
111 Second FFT section
112 Second multiplier
113 Second IFFT section
114 Second zero padding section
115 Third FFT section
116 Third multiplier
117 First adder
118 First delay section
120, 120a First coefficient updating section
131a Time-domain filter
132a Second adder
141a Fourth FFT section
142a Fourth multiplier
143a Third IFFT section
144a Fifth multiplier
145a Third adder
146a Second delay section
200 Signal conversion section
201 First wide-bit memory
201a, 201b, 207a, 207b Wide-bit memory
202 First register group
202a, 202b, 206a, 206b Register group
203 First connection switching section
204 Butterfly operation section group 205 Second connection switching section
206 Second register group
207 Second wide-bit memory
208 Twiddle-factor wide-bit memory
209 Twiddle-factor register group
310a Filtering operation section
311a, 321a, 413a Multiplier
312a, 521a Register
313a, 323a, 411a, 412a Adder
320a Second coefficient updating section
322a Step-size coefficient multiplier
324a Register
410a Butterfly operation section
414a First switching section
420a Twiddle-factor register
430a Second switching section
440a Third switching section
450a, 540a, 550a, 560a Control section
500a Register group placement section
510a Register input-side switching section group
511a Register input-side switching section
520a Register group
530a Register output-side switching section group
531a Register output-side switching section
610b Wide-bit memory
620b Address conversion section
630b Serial/parallel conversion section
640b Parallel/serial conversion section
650b ATSC/OFDM switching section
660b M-counter
1501 Third zero padding section
1502 Fourth zero padding section
1503 Partial tap coefficient updating section
1504 Time-domain filter
1601 Adder
1602 Multiplier
1603 Filtering operation section
1604 Register

The invention claimed is:

1. An adaptive equalizer that performs adaptive equalization on a time-domain signal in a frequency domain, comprising a signal conversion section that performs at least one of a fast Fourier transform and an inverse fast Fourier transform, wherein the signal conversion section includes:
a memory capable of reading and writing signals for 2M samples, where M is a natural number;
2M registers accessible to the memory;
M butterfly operation sections; and
a switching control section that switches a connection state between the 2M registers and the M butterfly operation sections, wherein:
the signal conversion section includes two pairs of the memory and the 2M registers; and
the switching control section switches a connection state (i) between the 2M registers in one of the two pairs and the M butterfly operation sections and (ii) between the 2M registers in the other of the two pairs and the M butterfly operation sections, such that a role of the memory is switched between a memory for output and a memory for input for each stage of the fast Fourier transform and the inverse fast Fourier transform.

2. The adaptive equalizer according to claim 1, further comprising:
a first signal conversion section as the signal conversion section that performs the fast Fourier transform; and
a second signal conversion section as the signal conversion section that performs the inverse fast Fourier transform on a signal on which the fast Fourier transform is performed by the first signal conversion section, wherein:
the first signal conversion section does not perform a bit-reversal permutation in the fast Fourier transform; and
the second signal conversion section does not perform a bit-reversal permutation in the inverse fast Fourier transform.

3. The adaptive equalizer according to claim 1, wherein the signal conversion section further includes:
a twiddle-factor memory that stores twiddle factors in each stage of the fast Fourier transform and the inverse fast Fourier transform, and that is capable of reading signals for M samples; and
M twiddle-factor registers that are accessible to the twiddle-factor memory, and that obtains the twiddle factors and passes the twiddle factors to the M butterfly operation sections.

4. The adaptive equalizer according to claim 1, wherein:
the adaptive equalizer is provided in a reception apparatus including a multi-carrier demodulation section; and
the memory is used in common with a memory in the multi-carrier demodulation section.

5. The adaptive equalizer according to claim 4, further comprising:
an input/output section that includes an address conversion section, a serial/parallel conversion section, and a parallel/serial conversion section, and controls input and output of signals to and from the memory; and
a control section that switches configuration of the input/output section depending on whether a method for accessing the memory is random or sequential.

6. The adaptive equalizer according to claim 5, wherein in a writing mode when the method for accessing the memory is random, the input/output section reads data for 2M samples from the memory before writing the data and overwrites the data only on a predetermined location of the memory.

7. An adaptive equalizer that performs adaptive equalization on a time-domain signal in a frequency domain, comprising:
a signal conversion section that performs at least one of a fast Fourier transform and an inverse fast Fourier transform, wherein the signal conversion section includes:
a memory capable of reading and writing signals for 2M samples, where M is a natural number;
2M registers accessible to the memory;
M butterfly operation sections; and
a switching control section that switches a connection state between the 2M registers and the M butterfly operation sections;
an accumulation section that receives input of a signal in the time domain and sequentially accumulates the signals for a predetermined block size;
an inter-block concatenating section that concatenates a block accumulated last time and a newest block;
a first fast Fourier transform section as the signal conversion section that performs the fast Fourier transform on output from the inter-block connecting section;
a first multiplier that multiplies output from the first fast Fourier transform section and a coefficient for adaptive equalizer converted into the frequency domain;
a first inverse fast Fourier transform section as the signal conversion section that performs the inverse fast Fourier transform on output from the first multiplier;
a block extracting section that extracts a newest block of signal series from the output from the first inverse fast Fourier transform section;

an error extracting section that extracts an error from output from the first inverse fast Fourier transform section to an ideal signal point;

a first zero padding section that pads zero to a series of the error extracted, except for a part denoting desired tap coefficients;

a second fast Fourier transform section as the signal conversion section that performs the fast Fourier transform on output from the first zero padding section;

a second multiplier that multiplies complex conjugation of output from the first fast Fourier transform section and output from the second fast Fourier transform section;

a second inverse fast Fourier transform section as the signal processing section that performs inverse fast Fourier transform on a multiplication result of the second multiplier;

a second zero padding section that pads zero to output from the second inverse fast Fourier transform section, except for a part denoting desired tap coefficients;

a third fast Fourier transform section as the signal processing section that performs the fast Fourier transform on output from the second zero padding section;

a third multiplier that multiplies output from the third fast Fourier transform section and a predetermined coefficient; and an accumulation section that accumulates output from the third multiplier.

8. The adaptive equalizer according to claim 7, further comprising a time-domain filter section that performs decision-feedback equalization on output from the first inverse fast Fourier transform section, wherein at least one of the registers in the first to third fast Fourier transform section and the first and second inverse fast Fourier transform section is used in common with a register in the time-domain filter section.

9. The adaptive equalizer according to claim 7, further comprising a time-domain filter section that performs decision-feedback equalization on at least the output from the first inverse fast Fourier transform section of a main wave, using a filtering coefficient updated in a frequency shorter than the block size.

10. The adaptive equalizer according to claim 7, further comprising a time-domain filter section that performs decision-feedback equalization on output from the first inverse fast Fourier transform section, wherein at least one of multipliers used for butterfly operation sections in the first to third fast Fourier transform sections and the first and second inverse fast Fourier transform sections is used in common with a multiplier for convolution operation by the time-domain filter section.

11. The adaptive equalizer according to claim 7, wherein at least one of multipliers used for butterfly operation sections in the first to third fast Fourier transform sections and the first and second inverse fast Fourier transform sections is used in common with a multiplier for the first to third multipliers.

* * * * *